(12) United States Patent
Yang et al.

(10) Patent No.: US 12,437,685 B2
(45) Date of Patent: Oct. 7, 2025

(54) DISPLAY DEVICE AND INSPECTION METHOD THEREOF

(71) Applicant: SAMSUNG DISPLAY CO., LTD., Yongin-si (KR)

(72) Inventors: Tae Hyeon Yang, Yongin-si (KR); Jun Young Ko, Yongin-si (KR); Han Su Cho, Yongin-si (KR); Tae Joon Kim, Yongin-si (KR); Jae Woo Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/804,628

(22) Filed: Aug. 14, 2024

(65) Prior Publication Data
US 2024/0404440 A1    Dec. 5, 2024

Related U.S. Application Data

(63) Continuation of application No. 18/469,768, filed on Sep. 19, 2023, now Pat. No. 12,087,192.

(30) Foreign Application Priority Data

Mar. 3, 2023    (KR) ................. 10-2023-0028608

(51) Int. Cl.
*G06F 3/041* (2006.01)
*G06F 3/044* (2006.01)
(Continued)

(52) U.S. Cl.
CPC ........... *G09G 3/006* (2013.01); *G06F 3/0412* (2013.01); *G06F 3/04166* (2019.05); *G06F 3/0418* (2013.01); *G06F 3/0446* (2019.05); *G09G 3/3233* (2013.01); *G09G 2300/0842* (2013.01); *G09G 2330/12* (2013.01)

(58) Field of Classification Search
CPC .. G09G 3/006; G09G 3/3233; G09G 2330/12; G06F 3/04166; G06F 3/0446; G06F 3/0412; G06F 3/0418
See application file for complete search history.

(56) References Cited

U.S. PATENT DOCUMENTS 9,104,267 B2    8/2015    Choi et al.
2020/0201475 A1    6/2020    Mani
(Continued)

FOREIGN PATENT DOCUMENTS

KR    10-2014-0071050    6/2014

OTHER PUBLICATIONS

U.S. Appl. No. 18/469,768, filed Sep. 13, 2023, parent application, not yet published.

*Primary Examiner* — Dennis P Joseph
(74) *Attorney, Agent, or Firm* — F. CHAU & ASSOCIATES, LLC

(57) ABSTRACT

A display device includes a touch panel and a display panel. The touch panel outputs touch sensing signals. At least one of a plurality of touch sensing signals is converted from a time domain to a frequency domain, and then information on a thickness of a common electrode is detected based on a peak of the converted touch sensing signal. As a result, it is possible to inspect whether the common electrode is formed with a uniform thickness without destroying the display device.

5 Claims, 20 Drawing Sheets

(51) Int. Cl.
*G09G 3/00* (2006.01)
*G09G 3/3233* (2016.01)

(56) References Cited

U.S. PATENT DOCUMENTS

| | | |
|---|---|---|
| 2020/0201485 A1 | 6/2020 | Moon |
| 2020/0285337 A1 | 9/2020 | Lee |
| 2021/0149527 A1 | 5/2021 | Song |
| 2021/0191553 A1 | 6/2021 | Jang |
| 2023/0093204 A1* | 3/2023 | Latif .................. G06F 11/3438 345/173 |
| 2023/0214076 A1 | 7/2023 | Chu et al. |
| 2023/0214079 A1 | 7/2023 | Lee et al. |
| 2023/0354643 A1* | 11/2023 | Sato .................. G06V 40/1318 |

* cited by examiner

FIG. 19A

<Case 1>

|  | FREQ | Rx1 | Rx2 | Rx3 | Rx4 | Rx5 | Rx6 |
|---|---|---|---|---|---|---|---|
| Tx1 | FREQ1 | 0.36 | 0.33 | 0.33 | 0.33 | 0.33 | 0.36 |
| Tx2 | FREQ2 | 0.26 | 0.25 | 0.25 | 0.25 | 0.25 | 0.25 |
| Tx3 | FREQ3 | 0.21 | 0.2 | 0.2 | 0.2 | 0.2 | 0.21 |
| Tx4 | FREQ4 | 0.17 | 0.17 | 0.17 | 0.17 | 0.17 | 0.17 |
| Tx5 | FREQ5 | 0.15 | 0.14 | 0.14 | 0.14 | 0.14 | 0.15 |
| Tx6 | FREQ6 | 0.03 | 0 | 0 | 0 | 0.03 | 0 |

FIG. 19B

<Case 3>

|     | FREQ  | Rx1  | Rx2  | Rx3 | Rx4  | Rx5  | Rx6  |
|-----|-------|------|------|-----|------|------|------|
| Tx1 | FREQ1 | 0.36 | 0.33 | 0.33 | 0.33 | 0.6  | 0.64 |
| Tx2 | FREQ2 | 0.26 | 0.25 | 0.25 | 0.25 | 0.27 | 0.35 |
| Tx3 | FREQ3 | 0.21 | 0.2  | 0.2  | 0.2  | 0.2  | 0.24 |
| Tx4 | FREQ4 | 0.17 | 0.17 | 0.17 | 0.17 | 0.17 | 0.2  |
| Tx5 | FREQ5 | 0.15 | 0.14 | 0.14 | 0.14 | 0.14 | 0.16 |
| Tx6 | FREQ6 | 0.03 | 0    | 0    | 0    | 0.03 | 0    |

DISPLAY DEVICE AND INSPECTION METHOD THEREOF

CROSS-REFERENCE TO RELATED APPLICATIONS

The application claims priority to and the benefit of U.S. patent application Ser. No. 18/469,768, filed on Sep. 19, 2023, which claims priority to and benefit of Korean Patent Application No. 10-2023-0028608, filed Mar. 3, 2023, which is hereby incorporated by reference in its entirety.

BACKGROUND

1. Field

Embodiments of the present disclosure relate to a display device and an inspection method thereof.

2. Description of the Related Art

A variety of electronic devices have been manufactured to include displays. Examples include smart phones, computers, navigation systems, and gaming consoles, as well as many others. Among the more popular display devices are liquid crystal displays and an organic light emitting displays. These and other types of displays may include a touch sensor to allow for input of information.

SUMMARY

One or more embodiments described herein provide a display device which is capable of inspecting whether a common electrode is formed with a uniform thickness.

One or more additional embodiments provide a method of inspecting the display device in a manner which does not destroy the display device.

An inspection method of a display device according to embodiments of the present disclosure may include forming a common electrode connected to a plurality of sub-pixels; arranging a touch panel to overlap the common electrode; inputting touch driving signals having different frequencies to a plurality of first touch electrodes extending in a first direction in the touch panel; receiving a plurality of touch sensing signals from a plurality of second touch electrodes extending in a second direction in the touch panel; converting at least one of the plurality of received touch sensing signals from a time domain to a frequency domain; and detecting information on a thickness of the common electrode based on a peak of a converted touch sensing signal.

In the inputting the touch driving signals having different frequencies to the plurality of first touch electrodes extending in the first direction, the touch driving signals having different frequencies may be simultaneously input to the plurality of first touch electrodes.

The detecting the information on the thickness of the common electrode may include determining whether peaks of the touch sensing signals sequentially increase as a frequency increases in the frequency domain.

When a peak of the common electrode does not increase sequentially, it may be determined that the common electrode is formed with a thin thickness in a region overlapping with any one of the plurality of first touch electrodes.

The inspection method of the display device may further include converting the rest of the plurality of received touch sensing signals from the time domain to the frequency domain.

The inspection method of the display device may further include comparing heights of peaks of the plurality of touch sensing signals converted to the frequency domain.

When it is determined that a height of the peak of any one of the plurality of touch sensing signals is high, it may be determined that the common electrode is formed with a thin thickness in a region overlapping with a second touch electrode from which one touch sensing signal is output among the plurality of second touch electrodes.

When it is determined that the peak of the common electrode increases sequentially and the heights of the peaks of the plurality of touch sensing signals are uniform, it may be determined that the common electrode is formed with a uniform thickness.

The forming the common electrode connected to the plurality of sub-pixels may include disposing a first base substrate; forming a thin film transistor and a capacitor included in a sub-pixel on the first base substrate; and forming the common electrode of the sub-pixel.

The inspection method of the display device may further include forming an anode electrode electrically connected to at least one of the thin film transistor and the capacitor; and depositing a light emitting layer on the anode electrode. The common electrode of the sub-pixel may be a cathode electrode of a light emitting element.

A display device according to embodiments of the present disclosure may include a display panel having a plurality of sub-pixels disposed in a display area, the plurality of sub-pixels being connected to a common electrode; and a touch panel including a plurality of first touch electrodes extending in a first direction and a plurality of second touch electrodes extending in a second direction, the plurality of first touch electrodes and the plurality of second touch electrodes being arranged to overlap with the common electrode. Touch driving signals having different frequencies may be input to the plurality of first touch electrodes, touch sensing signals may be received from the plurality of second touch electrodes, at least one of the plurality of received touch sensing signals may be converted from a time domain to a frequency domain, and information on a thickness of the common electrode may be detected based on a peak of a converted touch sensing signal.

The touch driving signals having different frequencies input from outside may be simultaneously input to the plurality of first touch electrodes.

The display device according to embodiments of the present disclosure may further include a touch driving circuit configured to simultaneously supply the touch driving signals having different frequencies to the plurality of first touch electrodes.

The display device according to embodiments of the present disclosure may further include a touch sensing circuit configured to receive the touch sensing signals from the plurality of second touch electrodes, convert at least one of the plurality of received touch sensing signals from the time domain to the frequency domain, and detect the information on the thickness of the common electrode based on the peak of the converted touch sensing signal.

The touch sensing circuit may determine whether peaks of the touch sensing signals sequentially increase as a frequency increases in the frequency domain.

When the touch sensing circuit determines that a peak of the common electrode does not increase sequentially, it may be determined that the common electrode is formed with a thin thickness in a region overlapping with any one of the plurality of first touch electrodes.

The touch sensing circuit may convert the rest of the plurality of received touch sensing signals from the time domain to the frequency domain, and compare heights of the peaks of the plurality of touch sensing signals converted to the frequency domain.

When the touch sensing circuit determines that a height of the peak of any one of the plurality of touch sensing signals is high, it may be determined that the common electrode is formed with a thin thickness in a region overlapping with a second touch electrode from which one touch sensing signal is output among the plurality of second touch electrodes.

When the touch sensing circuit determines that the peak of the common electrode increases sequentially and the heights of the peaks of the plurality of touch sensing signals are uniform, it may be determined that the common electrode is formed with a uniform thickness.

The sub-pixel may include a pixel driving circuit including at least one transistor and at least one capacitor; and a light emitting element electrically connected to the pixel driving circuit and receiving a common voltage through the common electrode.

In accordance with one or more other embodiments, a method for inspecting a display device includes inputting a touch driving signal to a first touch electrode of a touch panel adjacent to a display panel; receiving a touch sensing signal from a second touch electrode of the touch panel; detecting at least one peak in the touch sensing signal; and determining a defect in the touch panel based on the at least one peak. The defect may be indicative of a thickness of a common electrode of a corresponding light-emitting element in the display panel.

Determining the defect may include determining whether the at least one peak is above a predetermined level, and detecting the defect when the at least one peak is above the predetermined level. The touch sensing signal may include a plurality of peaks, and determining the defect may include detecting that the plurality of peaks increase non-sequentially. The at least one peak may be indicative of a resistance of the common electrode above a predetermined level at a location overlapping the first touch electrode.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 19A is a table illustrating an example of an amplitude of the touch sensing signal in the first case according to an embodiment, and FIG. 19B is a table illustrating an example of an amplitude of the touch sensing signal in the third case according to an embodiment.

DETAILED DESCRIPTION

Figure 1:
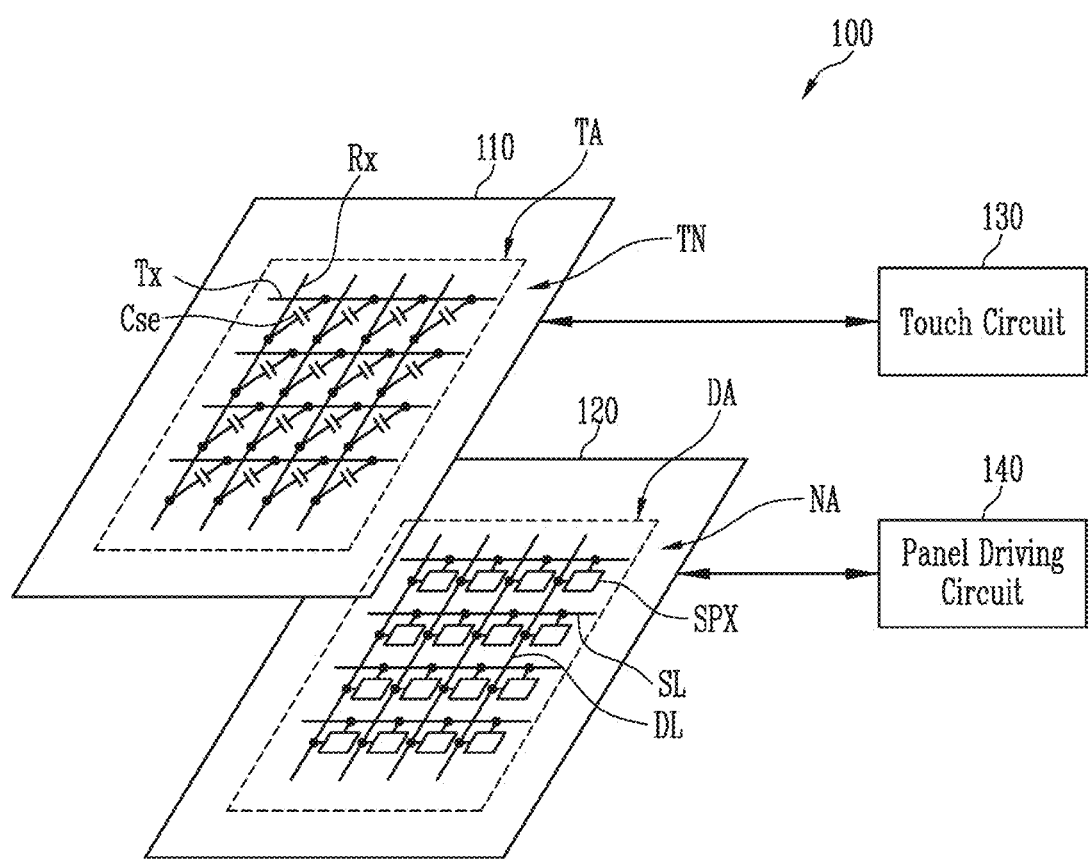
FIG. 1 is a diagram schematically illustrating a display device according to embodiments of the present disclosure.

Hereinafter, various embodiments of the present disclosure will be described in detail with reference to the accompanying drawings so that those of ordinary skill in the art may easily implement the present disclosure. The present disclosure may be embodied in various different forms and is not limited to the embodiments described herein.

In order to clearly describe the present disclosure, parts that are not related to the description are omitted, and the same or similar components are denoted by the same reference numerals throughout the specification. Therefore, the reference numerals described above may also be used in other drawings.

In addition, the size and thickness of each component shown in the drawings are arbitrarily shown for convenience of description, and thus the present disclosure is not necessarily limited to those shown in the drawings. In the drawings, thicknesses may be exaggerated to clearly express the layers and regions.

In addition, in the description, the expression "is the same" may mean "substantially the same". That is, it may be the same enough to convince those of ordinary skill in the art to be the same. In other expressions, "substantially" may be omitted.

FIG. 1 is a diagram schematically illustrating a display device 100 according to embodiments of the present disclosure. The display device 100 may be applied to a mobile communication terminal. For example, the display device 100 may constitute a portable terminal by being disposed in a bracket and/or a case together with electronic modules mounted on a main board, a camera module, a power module, and the like. However, the display device 100 is not limited thereto. For example, the display device 100 may be applied to electronic devices such as televisions, laptops, monitors, billboards, and Internet of Things (IoT), small and medium-sized electronic devices such as mobile phones, smart phones, tablet PCs (Tablet Personal Computers), navigation devices, smart watches, watch phones, UMPCs (Ultra Mobile Personal Computers), PMPs (Portable Multimedia Players), electronic notebooks, and electronic books, and the like.

Referring to FIG. 1, the display device 100 may include a touch panel 110, a display panel 120, a touch circuit 130, a panel driving circuit 140, and the like. The touch panel 110 and the display panel 120 are shown separated from each other. However, this is only for the purpose of functionally distinguishing the touch panel 110 and the display panel 120 within the display device 100. For example, the touch panel 110 according to embodiments of the present disclosure may be formed in a process different from that of the display panel 120, and then the touch panel 110 and the display panel 120 may be coupled to each other (for example, the touch panel 110 may be attached to and coupled to one surface of the display panel 120). As described above, the touch panel 110 may be formed as an add-on type. Unlike this, the touch panel 110 according to embodiments of the present disclosure may be formed in the same process (for example, a process of manufacturing the display panel 120) as the display panel 120. As described above, the touch panel 110 may be formed in an in-cell type.

The touch panel 110 may be provided on one surface of the display panel 120. For example, the touch panel 110 may be disposed on one surface (for example, an upper surface) on which an image is displayed among both surfaces of the display panel 120. In one embodiment, the touch panel 110 may be formed directly on at least one of both surfaces of the display panel 120 or inside the display panel 120. For example, the touch panel 110 may be formed directly on an outer surface of an upper or lower substrate of the display panel 120 (e.g., an upper surface of the upper substrate or a lower surface of the lower substrate) or may be formed directly on an inner surface of the upper substrate (e.g., a lower surface of the upper substrate) or an inner surface of the lower substrate (e.g., an upper surface of the lower substrate).

The touch panel 110 may include a touch active area TA capable of detecting a touch input and a touch inactive area TN disposed outside the touch active area TA (for example, a peripheral area or an edge area of the touch active area TA). According to an embodiment, the touch active area TA may be disposed to correspond to a display area DA of the display panel 120.

According to an embodiment, the touch panel 110 may be disposed to overlap at least one area of the display panel 120. For example, the touch active area TA of the touch panel 110 may be disposed on the display area DA of the display panel 120. According to an embodiment, at least one electrode for detecting a touch input may be disposed in the touch active area TA. At least one electrode for detecting a touch input may include, for example, a first touch electrode Tx and a second touch electrode Rx. The first touch electrode Tx and the second touch electrode Rx may be provided on the display area DA of the display panel 120.

Wirings for electrically connecting at least one electrode provided in the touch active area TA to the touch circuit 130 may be disposed in the touch inactive area TN. For example, wirings for electrically connecting the first touch electrode Tx and the second touch electrode Rx to the touch circuit 130 may be disposed in the touch inactive area TN. The touch inactive area TN may be disposed to correspond to a non-display area NA of the display panel 120.

The touch panel 110 may include at least one first touch electrode Tx and at least one second touch electrode Rx provided in the touch active area TA. For example, the touch panel 110 may include the first touch electrode Tx and the second touch electrode Rx crossing the first touch electrode Tx. According to an embodiment, the first touch electrode Tx may extend along a first direction, and the second touch electrode Rx may extend along a second direction crossing the first direction, while being insulated from the first touch electrode Tx by an insulating film. A capacitance Cse may be formed between the first touch electrode Tx and the second touch electrode Rx. This capacitance Cse may change when a touch input occurs at or around the corresponding point. Accordingly, the touch input may be sensed by detecting a change in capacitance Cse. The shape, size, and/or arrangement direction of the first touch electrode Tx and the second touch electrode Rx are not particularly limited. Embodiments related to this will be described through FIGS. 5 and 6 below.

The display panel 120 may include the display area DA and the non-display area NA located outside the display area DA (for example, an edge area or a peripheral area of the display area DA). A scan line SL, a data line DL, and a sub-pixel SPX connected to the scan line SL and the data line DL may be disposed in the display area DA. Wirings for supplying various driving signals and/or power sources for driving the sub-pixel SPX may be provided in the non-display area NA.

In embodiments of the present disclosure, the type of the display panel 120 is not particularly limited. For example, in embodiments of the present disclosure, the display panel 120 may be a self-light emitting display panel. In the above embodiment, the display panel 120 may include a plurality of light emitting elements. For example, the light emitting element may be an organic light emitting diode. In one embodiment, the light emitting element may be an inorganic light emitting diode such as a micro light emitting diode (LED) or a quantum dot light emitting diode. For example, the light emitting element may be an element composed of a combination of an organic material and an inorganic material.

In embodiments of the present disclosure, the display panel 120 may be a non-light emitting display panel such as a liquid crystal display (LCD) panel, an electro-phoretic display (EPD) panel, or an electro-wetting display (EWD) panel. When the display panel 120 is a non-light emitting display panel, the display device 100 may further include a backlight unit for supplying light to the display panel 120.

The touch circuit 130 may be connected (for example, electrically connected) to the touch panel 110 to transmit a signal to be input to the touch panel 110, or to receive a signal output from the touch panel 110. The touch circuit 130 may supply a touch driving signal to the touch panel 110, and may receive a touch sensing signal corresponding to the touch driving signal from the touch panel 110 to detect a touch input. To this end, the touch circuit 130 may include a touch driving circuit and a touch sensing circuit. According to an embodiment, the touch driving circuit and the touch sensing circuit may be integrated into one integrated circuit (IC), but embodiments of the present disclosure are not limited thereto. According to an embodiment, the touch circuit 130 (for example, the touch driving circuit) may simultaneously (or sequentially) supply the touch driving signal to a plurality of first touch electrodes Tx. The touch circuit 130 (for example, the touch sensing circuit) may simultaneously (or sequentially) receive the touch sensing signal from a plurality of second sensing electrodes Rx. The touch circuit 130 may receive the touch sensing signal from the touch panel 110 and perform signal processing on the touch sensing signal to detect a touch input and/or touch coordinates.

The panel driving circuit 140 may be connected (for example, electrically connected) to the display panel 120 to supply a signal to the display panel 120 or to receive a signal output from the display panel 120. The panel driving circuit 140 may supply the scan signal to the scan line SL and the data signal (or data voltage) to the data line DL.

Figure 2:
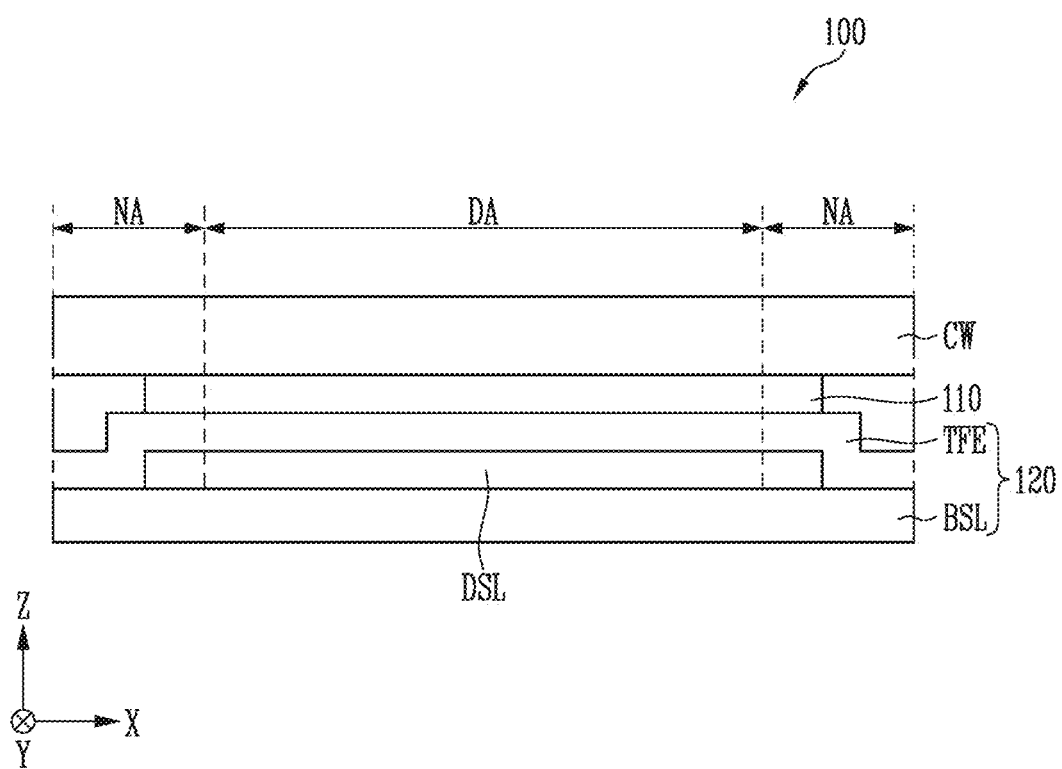
FIG. 2 is a cross-sectional view illustrating an example of the display device of FIG. 1.

FIG. 2 is a cross-sectional view illustrating an example of the display device 100 of FIG. 1.

Referring to FIG. 2, the display device 100 may include the display panel 120 and the touch panel 110 disposed on the display panel 120. A cover window CW may be disposed on the touch panel 110. FIG. 2 shows an embodiment in which the display panel 120 is a self-emitting light display panel including a light emitting element as an example. However, embodiments of the present disclosure are not limited thereto.

The display panel 120 may include a first base substrate BSL, an element layer DSL, an encapsulation layer TFE, and the like. The first base substrate BSL may support the element layer DSL. The first base substrate BSL may include an insulating material. The insulating material may include, for example, at least one of glass, quartz, ceramic, and/or plastic. The first base substrate BSL may be a rigid substrate. According to an embodiment, the first base substrate BSL may be a flexible substrate, which bends, folds, or otherwise flexes.

The element layer DSL may be located on the first base substrate BSL (for example, in a Z-axis direction). The element layer DSL may include the sub-pixel(s) SPX (e.g., refer to FIG. 1) and a signal line positioned on the first base substrate BSL. The sub-pixel SPX may include a thin film transistor (TFT) and a capacitor. According to an embodiment, the sub-pixel SPX may include the light emitting element connected (for example, electrically connected) to the thin film transistor and/or the capacitor. The signal line may include the scan line configured to transmit a scan signal to each sub-pixel and the data line configured to transmit a data signal to corresponding sub-pixels. The sub-pixel SPX included in the element layer DSL may be disposed in the display area DA. A common electrode (for example, a cathode electrode of the light emitting element or a common electrode of a liquid crystal display device) may be formed in the element layer DSL.

The encapsulation layer TFE may be disposed on the element layer DSL. The encapsulation layer TFE may protect the element layer DSL from external moisture and/or oxygen. The encapsulation layer TFE may include two or more thin film layers formed on the element layer DSL. For example, the encapsulation layer TFE may include an inorganic thin film layer formed on the element layer DSL, an organic thin film layer formed on the inorganic thin film layer, and an inorganic thin film layer disposed on the organic thin film layer. According to an embodiment, the encapsulation layer TFE may be formed of a glass substrate to cover the element layer DSL. Hereinafter, an embodiment in which the encapsulation layer TFE includes two or more thin film layers will be described as an example, but embodiments of the present disclosure are not limited thereto. The encapsulation layer TFE may cover the element layer DSL in the display area DA and the non-display area NA.

The touch panel 110 may be disposed on the encapsulation layer TFE. According to an embodiment, the touch panel 110 may be directly formed on the encapsulation layer TFE, or the touch panel 110 may be formed through a process different from that of the display panel 120 and disposed (for example, attached) on the encapsulation layer TFE. The touch panel 110 may have the touch active area TA (e.g., refer to FIG. 1) in at least a part of an area overlapping the display area DA. The touch panel 110 may have the touch inactive area TN (e.g., refer to FIG. 1) in at least a part of an area overlapping the non-display area NA.

The cover window CW may be disposed on the touch panel 110. The cover window CW may protect the display panel 120 and the touch panel 110 from external impact. The cover window CW may be implemented with a light-transmitting material, for example, a film made of glass and/or plastic material.

According to an embodiment, the display device 100 may further include one or more optical layers (for example, an anti-glare layer, a polarizing plate, a color filter, liquid crystal, etc.).

Figure 3:
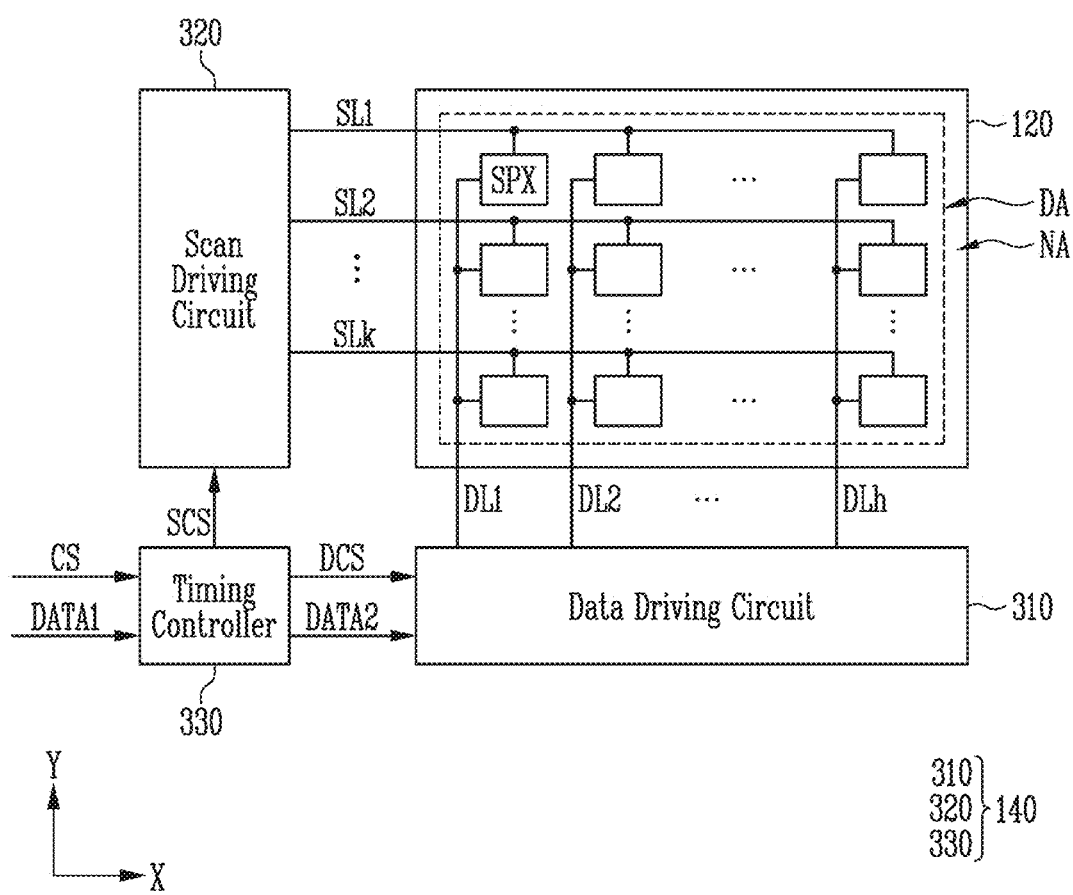
FIG. 3 is a system block diagram of a display panel and a panel driving circuit of FIG. 1 according to an embodiment.

FIG. 3 is a system block diagram of a display panel 120 and a panel driving circuit 140 of FIG. 1. Referring to FIG. 3, the panel driving circuit 140 may include a data driving circuit 310, a scan driving circuit 320, a timing controller 330, and the like. However, these components are merely classified according to their functions within the panel driving circuit 140. For example, the data driving circuit 310 and the timing controller 330 may be implemented as different integrated circuits, but according to an embodiment, the data driving circuit 310 and the timing controller 330 may be mounted in one integrated circuit.

A plurality of sub-pixels SPX may be disposed on the display panel 120. A plurality of data lines DL1 to DLh and a plurality of scan lines SL1 to SLk electrically connected to the plurality of sub-pixels SPX may be disposed on the display panel 120, where h and k are integers greater than or equal to 2. One or more common voltage lines configured to apply a common voltage to the plurality of sub-pixels SPX may be disposed on the display panel 120.

The display panel 120 may be formed flat, but the present disclosure is not limited thereto. For example, the display panel 120 may include curved portions formed at opposing (e.g., left and/or right) ends. In this case, the curved portion may have a constant curvature or a varying curvature. In addition, the display panel 120 may be formed to be flexible so as to be bent, folded, or rolled.

The plurality of sub-pixels SPX may be disposed in a matrix type arrangement in the display area DA. According to an embodiment, the plurality of sub-pixels SPX may be arranged in a PENTILE™ structure in the display area DA. The plurality of sub-pixels may be disposed according to a different arrangement in another embodiment.

The plurality of data lines DL1 to DLh may be arranged on the display panel 120 to extend in a first direction (for example, a direction crossing the display panel 120 from top to bottom or a Y-axis direction). The plurality of scan lines SL1 to SLk may be arranged on the display panel 120 to extend in a second direction (for example, a direction crossing the display panel 120 from left to right or an X-axis direction). The first direction and the second direction may be different from each other.

The data driving circuit 310 may be configured to supply data signals to a plurality of data lines DL1 to DLh. The data driving circuit 310 may generate each data signal based on input image data DATA2 and a data driving circuit control signal DCS. The data driving circuit 310 may output the generated data signals to the plurality of data lines DL1 to DLh according to timing. The data driving circuit control signal DCS may include, for example, a source start pulse (SSP), a source shift clock (SSC), a source output enable (SOE), and the like.

The scan driving circuit 320 may be configured to output the scan signal to the plurality of scan lines SL1 to SLk in response to a scan driving circuit control signal SCS. The scan signal may have a turn-on level voltage or a turn-off level voltage. The turn-on level voltage may be one of a high level voltage or a low level voltage. The turn-off level voltage may be the other of the high level voltage or the low level voltage. Levels of the turn-on level voltage and the turn-off level voltage may vary depending on the type of a switching element (for example, a thin film transistor) receiving the scan signal. The scan driving circuit control signal SCS may include a start signal indicating the start of a frame, a horizontal synchronization signal for outputting the scan signal to the display panel 120 according to the timing at which the data signal is applied, and the like. The scan driving circuit 320 may be implemented as an integrated circuit formed separately from the display panel 120. According to an embodiment, the scan driving circuit 320 may be formed together with the display panel 120 and positioned in the non-display area NA of the display panel 120.

The timing controller 330 may be configured to control the data driving circuit 310 and the scan driving circuit 320. The timing controller 330 may receive a control signal CS (for example, a synchronization signal, a clock signal, etc.) input from an external source (for example, a host system, etc.), and may generate and output the data driving circuit control signal DCS and the scan driving circuit control signal SCS based on the received control signal CS. The timing controller 330 may be implemented in logic or a type of processor. Timing controller 330 may include one or more registers.

The timing controller 330 may receive original image data DATA1 input from the external source (for example, a host system, etc.) and arrange the input original image data DATA1 in units of pixel rows. The timing controller 330 may convert the input original image data DATA1 according to a predetermined interface (for example, low voltage differential signaling (LVDS), embedded display port (eDP), etc.). The input image data DATA2 output from the timing controller 330 to the data driving circuit 310 may be converted inside the timing controller 330 according to the predetermined interface.

The host system may include a variety of systems. Examples, include a set-top box, an application processor (AP), or the like. According to an embodiment, the host system may be an external component not included in the display device 100 (e.g., refer to FIG. 1) according to the embodiments of the present disclosure. Between the host system and the display device, transmission and reception of the original image data DATA1 and the control signal CS may be performed through interfaces such as SPI (Serial Programming Interface), I2C (Inter Integrated Circuit), and MIPI (Mobile Industry Processor Interface).

Figure 4:
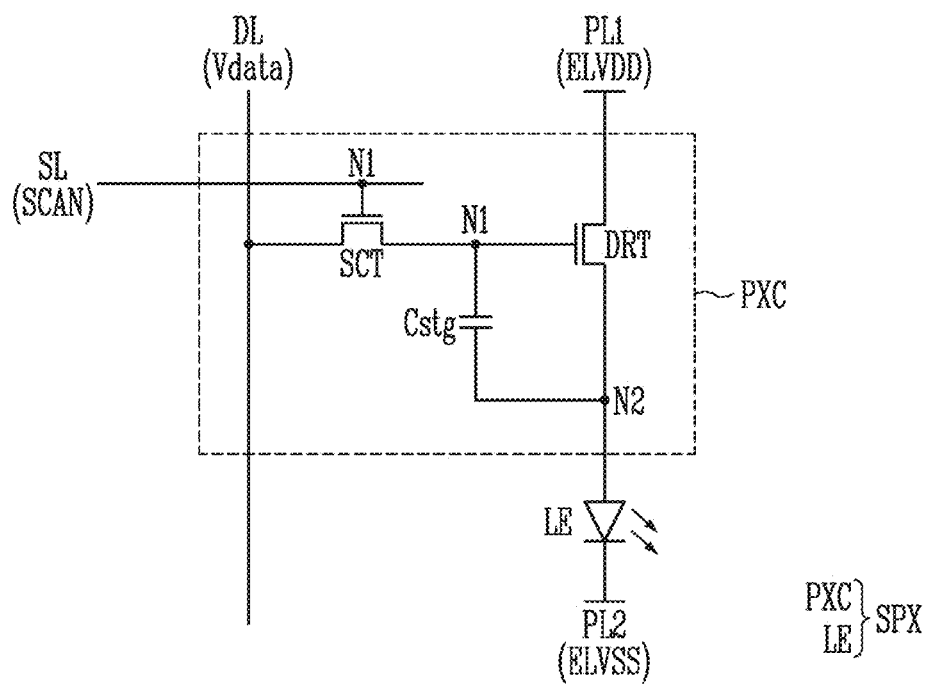
FIG. 4 is a diagram illustrating an example of a sub-pixel disposed on the display panel of FIG. 3 according to an embodiment.

FIG. 4 is a diagram illustrating an example of a sub-pixel SPX disposed on the display panel of FIG. 3. For convenience of description, in FIG. 4, the sub-pixel SPX including a light emitting element LE will be described as an example. However, embodiments of the present disclosure do not exclude embodiments that do not include the light emitting element LE (for example, embodiments in which the display device 100 (refer to FIG. 1) includes a backlight unit).

Referring to FIG. 4, the sub-pixel SPX may include a pixel driving circuit PXC and the light emitting element LE. The light emitting element LE may include a first electrode (one of an anode electrode or a cathode electrode), a second electrode (the other of the anode electrode or the cathode electrode), and a light emitting layer. For example, the light emitting element LE may be an organic light emitting diode. In one embodiment, the light emitting element LE may be an inorganic light emitting diode such as a micro light emitting diode (LED) or a quantum dot light emitting diode. For example, the light emitting element LE may be an element composed of a combination of an organic material and an inorganic material.

Referring to FIG. 4, the first electrode (for example, anode electrode) of the light emitting element LE may be electrically connected to a second node N2. The second electrode (for example, cathode electrode) of the light emitting element LE may be electrically connected to a second power source line PL2. A second common voltage ELVSS may be applied to the second power source line PL2. The second common voltage ELVSS may be, for example, a low potential common voltage or a ground voltage. The second electrode of the light emitting element LE may function as a common electrode commonly connected to the plurality of sub-pixels SPX (e.g., refer to FIG. 3).

The pixel driving circuit PXC may include two or more switching elements (for example, thin film transistors). The pixel driving circuit PXC may include one or more capacitors. Hereinafter, for convenience of description, a case in which the pixel driving circuit PXC includes two transistors and one capacitor will be described as an example, but embodiments of the present disclosure are not limited thereto.

Referring to FIG. 4, the pixel driving circuit PXC may include a first transistor DRT, a second transistor SCT, and a storage capacitor Cstg. The first transistor DRT may be configured to switch an electrical connection between a first power source line PL1 and the second node N2. The first transistor DRT may include a gate electrode, a first electrode (one of a source electrode or a drain electrode), and a second electrode (the other of the source electrode or the drain electrode). The gate electrode of the first transistor DRT may be electrically connected to the second transistor SCT at a first node N1. The first electrode (for example, the drain electrode) of the first transistor DRT may be electrically connected to the first power source line PL1. A first power source voltage ELVDD may be applied to the first power source line PL1. The first power source voltage ELVDD may be, for example, a high-potential power source voltage. The second electrode (for example, the source electrode) of the first transistor DRT may be electrically connected to the light emitting element LE at the second node N2. The first transistor DRT may receive a data voltage Vdata through the second transistor SCT. A current (for example, a drain current) having a magnitude corresponding to the input data voltage Vdata may flow through the first transistor DRT. The first transistor DRT may be referred to as a driving transistor.

The second transistor SCT may be configured to switch an electrical connection between the data line DL and the first node N1. Operation timing of the second transistor SCT may be controlled by a scan signal SCAN. The second transistor SCT may be turned on in response to the scan signal SCAN of a turn-on level. When the second transistor SCT is turned on, the data signal Vdata may be input to the first node N1. The second transistor SCT may be referred to as a scan transistor.

Referring to FIG. 4, both transistors DRT and SCT are shown as N-type transistors. In this case, the turn-on level voltage of the first transistor DRT and the second transistor SCT may be a high level voltage, and the turn-off level voltage of the first transistor DRT and the second transistor SCT may be a low level voltage. According to an embodiment, at least one of the first transistor DRT or the second transistor SCT may be a P-type transistor. In this case, the turn-on level voltage of the P-type transistor may be a low level voltage, and the turn-off level voltage of the P-type transistor may be a high level voltage.

At least one of the first transistor DRT and the second transistor SCT may include an amorphous silicon (a-Si) semiconductor. At least one of the first transistor DRT and the second transistor SCT may include a polycrystalline silicon (poly-Si) semiconductor. At least one of the first transistor DRT and the second transistor SCT may include an oxide semiconductor.

The storage capacitor Cstg may be configured to maintain a voltage difference between the first node N1 and the second node N2. The storage capacitor Cstg may include one electrode electrically connected to the first node N1 and the other electrode electrically connected to the second node N2. The storage capacitor Cstg may be formed of a physical capacitor element instead of a parasitic capacitor.

Figure 5:
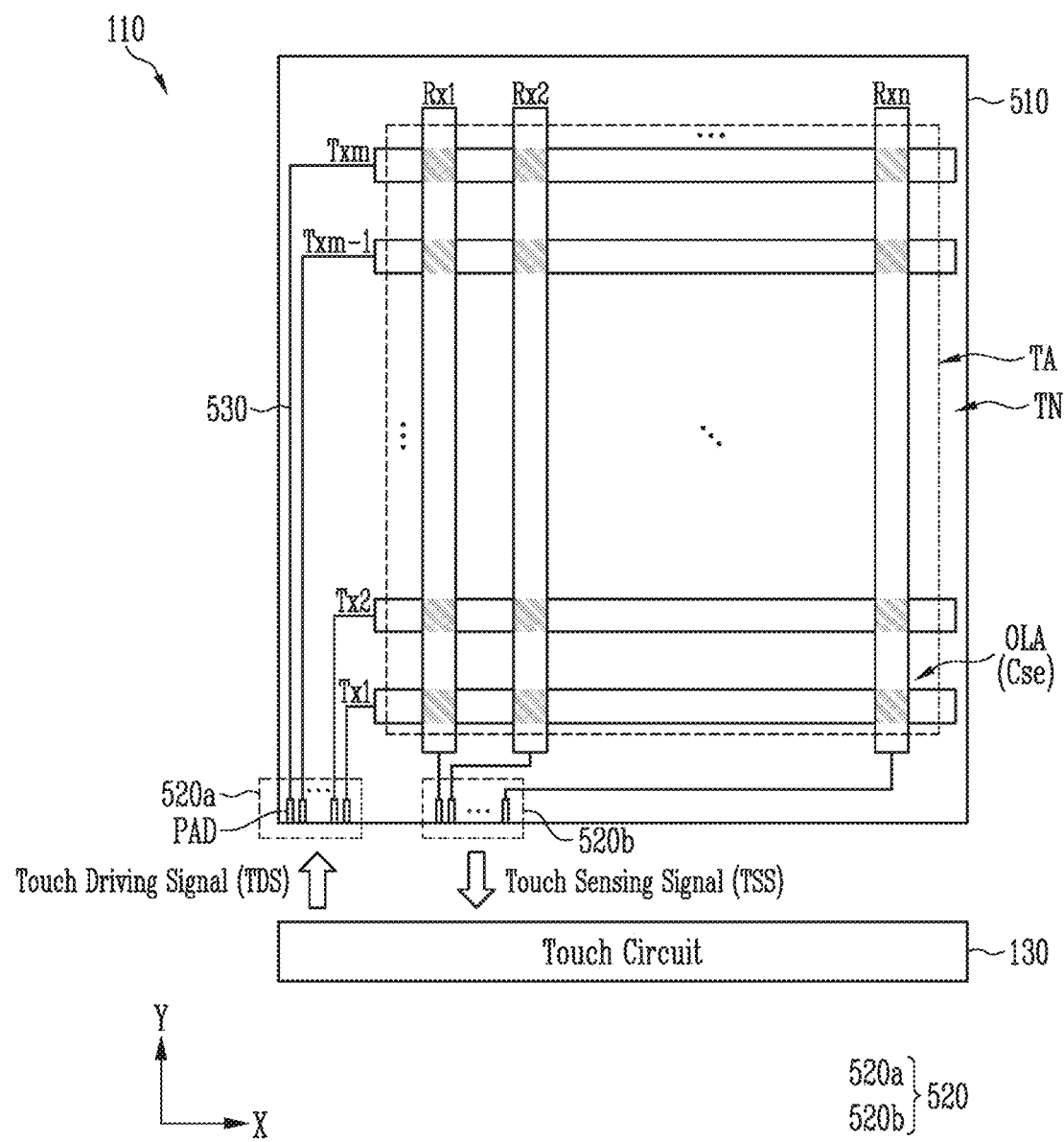
FIG. 5 is a system block diagram illustrating a touch panel and a touch circuit of FIG. 1 according to an embodiment.

FIG. 5 is a system block diagram illustrating a touch panel 110 and a touch circuit 130 of FIG. 1.

Referring to FIG. 5, the touch panel 110 according to embodiments of the present disclosure may include a second base substrate 510, a first touch electrode Tx, a second touch electrode Rx, a pad unit 520, and a wiring 530. The second base substrate 510 may be a base substrate for the touch panel 110 and may be a rigid or flexible substrate. For example, the second base substrate 510 may be a rigid substrate including glass or tempered glass, or a flexible substrate including a thin film made of a flexible plastic material. The first touch electrode Tx, the second touch electrode Rx, the pad unit 520, and the wiring 530 may be disposed on the second base substrate 510. According to an embodiment, the second base substrate 510 may be omitted (or replaced with another component). For example, when the first touch electrode Tx and the second touch electrode Rx are directly formed on the display panel 120 (e.g., refer to FIG. 1), the second base substrate 510 may be replaced with the first base substrate BSL (e.g., refer to FIG. 2) or the encapsulation layer TFE (e.g., refer to FIG. 2) described above.

The first touch electrode Tx may extend along a second direction (for example, a direction crossing the touch panel 110 from top to bottom, an X-axis direction, or a row direction). Referring to FIG. 5, each of a plurality of first touch electrodes Tx1 to Txm may extend in the row direction and may be disposed on the touch panel 110, where m may be an integer greater than or equal to 2.

The second touch electrode Rx may extend along a first direction (for example, a direction crossing the touch panel 110 from left to right, a Y-axis direction, or a column direction). Referring to FIG. 5, each of a plurality of second touch electrodes Rx1 to Rxn may extend in the column direction and may be disposed on the touch panel 110, where n is an integer greater than or equal to 2.

The touch panel 510 according to embodiments of the present disclosure may be driven in a mutual capacitance method. In the mutual capacitance method, one of the first touch electrode Tx or the second touch electrode Rx may function as a touch driving electrode, and the other may function as a touch sensing electrode. A touch driving signal TDS may be input to the touch driving electrode, and a touch sensing signal TSS may be output from the touch sensing electrode. According to an embodiment, the first touch electrode Tx may receive the touch driving signal TDS for touch driving, and the second touch electrode Rx may output the touch sensing signal TSS corresponding to the touch driving signal TDS. According to an embodiment, the second touch electrode Rx may receive the touch driving signal TDS, and the first touch electrode Tx may output the touch sensing signal TSS corresponding to the touch driving signal TDS. Hereinafter, for convenience of description, a case in which the touch driving signal TDS is input to the first touch electrode Tx and the touch sensing signal TSS is output from the second touch electrode Rx will be described as an example, but the embodiments of the present disclosure are not limited thereto.

A capacitance Cse may be formed between the first touch electrode Tx and the second touch electrode Rx. For example, referring to FIG. 5, the first touch electrode Tx and the second touch electrode Rx may be disposed to overlap each other in a vertical direction (for example, the Z-axis direction) in an overlapping area OLA. In the overlapping area OLA, the first touch electrode Tx may function as one electrode of the capacitor, and the second touch electrode Rx may function as the other electrode of the capacitor. The capacitance Cse may be formed between the first touch electrode Tx and the second touch electrode Rx in the overlapping area OLA. When an object (for example, a human finger, a stylus pen, etc.) approaches the touch panel 110, a capacitance Cse value may change. The touch circuit 130 may detect a touch input and/or a touch location based on the changed capacitance Cse value.

The pad unit 520 may include one or more pads PAD. The pad PAD may connect (for example, electrically connect) the first touch electrode Tx and the second touch electrode Rx to the touch circuit 130. For example, the touch driving signal TDS may be input to the first touch electrode Tx through a pad unit 520a (for example, first pad unit 520a). For example, the touch sensing signal TSS may be output from the second touch electrode Rx through a pad unit 520b (for example, second pad unit 520b).

The wiring 530 may connect (for example, electrically connect) the pad PAD and the first touch electrode Tx, or connect (for example, electrically connect) the pad PAD and the second touch electrode Rx. The pad unit 520 and the wiring 530 may be disposed in the touch inactive area TN.

Figure 6:
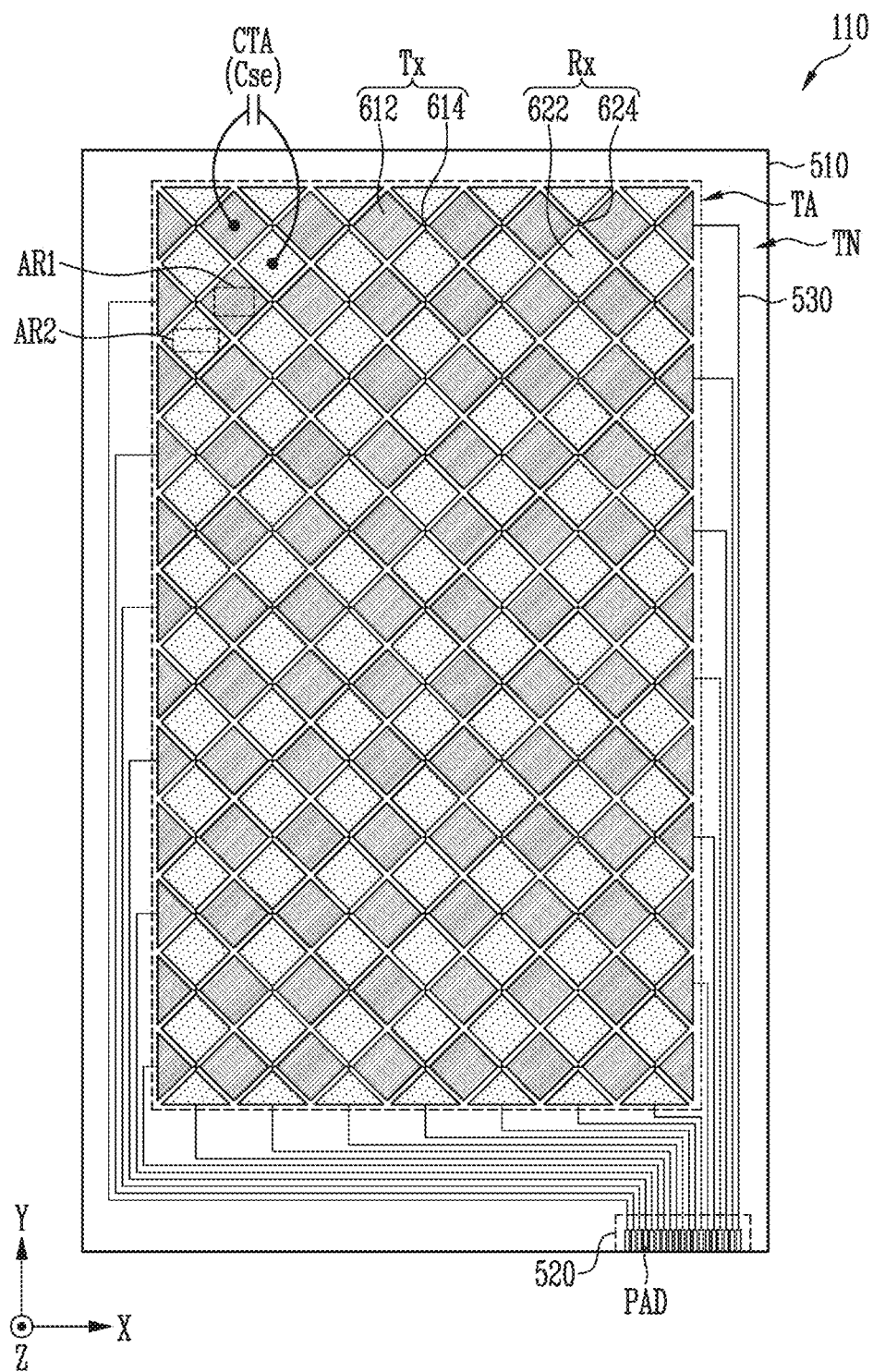
FIG. 6 is a diagram illustrating an example of the touch panel of FIG. 5 according to an embodiment.

FIG. 6 is a diagram illustrating an example of the touch panel 110 of FIG. 5. In the touch panel 110 according to embodiments of the present disclosure, the first touch electrode Tx may include a first sensing cell 612 and a first connection electrode 614, and the second touch electrode Rx may include a second sensing cell 622 and a second connection electrode 624.

The first touch electrode Tx may extend along the row direction. The first touch electrode Tx disposed in each row may include a plurality of first sensing cells 612 and the first connection electrode 614 configured to connect (for example, electrically connect) the plurality of first sensing cells 612 to each other. According to an embodiment, the first connection electrode 614 may be integrally formed with the first sensing cell 612. According to an embodiment, the first connection electrode 614 may be formed of a connection pattern having a bridge shape.

The second touch electrode Rx may extend along the column direction. The second touch electrode Rx disposed in each column may include a plurality of second sensing cells 622 and the second connection electrodes 624 configured to connect (for example, electrically connect) the plurality of second sensing cells 622 to each other. According to an embodiment, the second connection electrode 624 may be integrally formed with the second sensing cell 622. According to an embodiment, the second connection electrode 624 may be formed of a connection pattern having a bridge shape.

The first connection electrode 614 and the second connection electrode 624 may be positioned to overlap each other in the vertical direction (for example, the Z-axis direction). The first connection electrode 614 and the second connection electrode 624 may be insulated from each other by an insulating layer.

Referring to FIG. 6, a capacitance Cse may be formed between the first touch electrode Tx and the second touch electrode Rx. For example, the first touch electrode Tx may function as one electrode of the capacitor, and the second touch electrode Rx adjacent to the first touch electrode Tx may function as the other electrode of the capacitor. The capacitance Cse may be formed in an adjacent area CTA between the first touch electrode Tx and the second touch electrode Rx. Air between the first touch electrode Tx and the second touch electrode Rx may function as an insulating material for the capacitor. Accordingly, a touch input and/or touch coordinates may be detected in a mutual capacitance method.

Figure 7A:
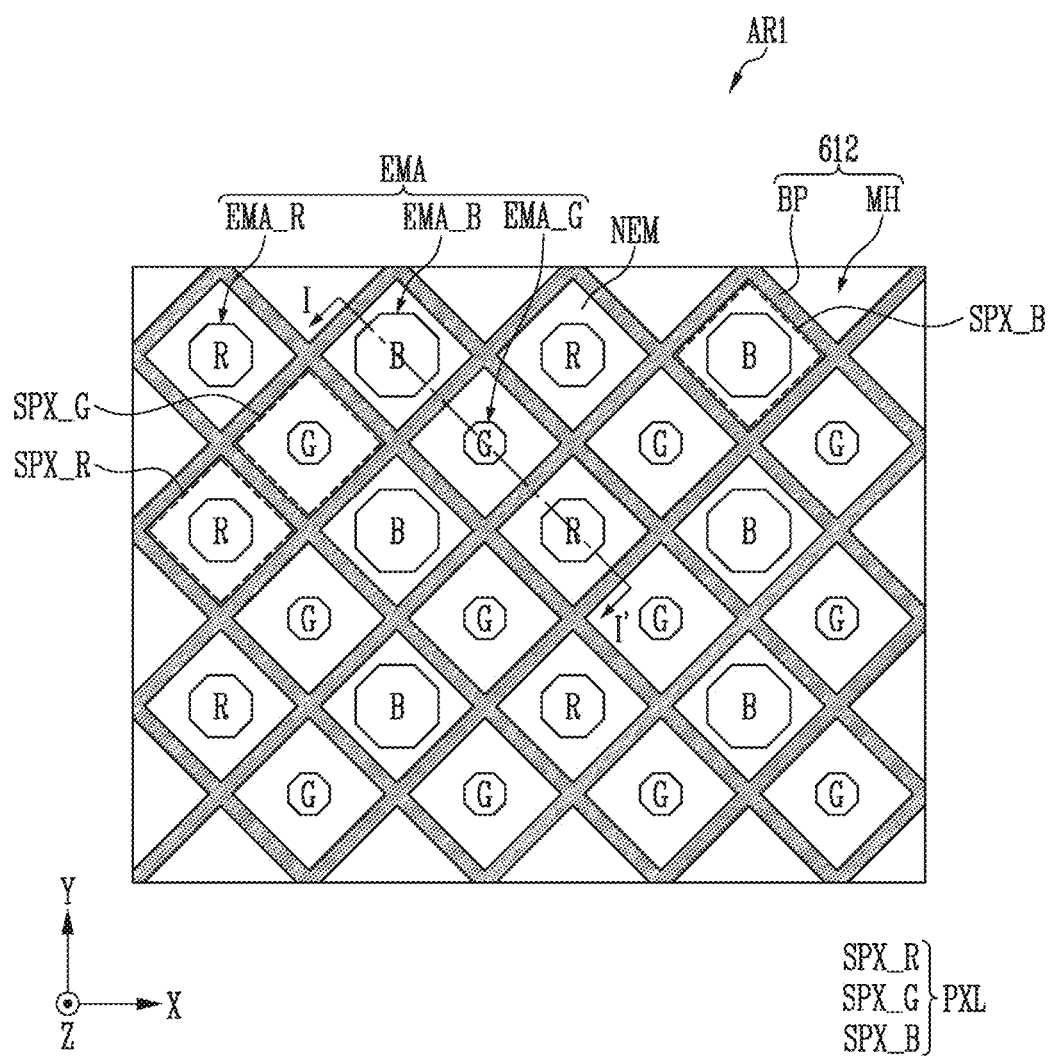
FIG. 7A is an enlarged view of a first region of FIG. 6 according to an embodiment.

FIG. 7A is an enlarged view of a first region AR1 of FIG. 6 according to an embodiment. In this embodiment, the pixel PXL may include the plurality of sub-pixels SPX. Each of the plurality of sub-pixels SPX may include an emission area EMA and a non-emission area NEM. Referring to FIG. 7A, the pixel PXL may include a first sub-pixel SPX_R, a second sub-pixel SPX_G, and a third sub-pixel SPX_B. As described in greater detail below, these sub-pixels may respectively emit red, green, and blue light, but may emit light of a different combination of colors in another embodiment.

The emission area EMA may be an area from which light can be emitted. For example, in an embodiment in which the sub-pixel SPX includes a light emitting element, the emission area EMA may correspond to an area where the light emitting element is located.

The non-emission area NEM may be located around (for example, an edge area) of the emission area EMA. The sub-pixels SPX may be distinguished from each other by the non-emission area NEM. According to an embodiment, the pixel driving circuit PXC described above (e.g., refer to FIG. 4) may be located in at least a part of an area overlapping the non-emission area NEM. According to an embodiment, the non-emission area NEM may correspond to an area where a pixel defining layer, a black matrix, and the like are located. The emission area EMA and the non-emission area NEM of each sub-pixel may constitute the display area DA described above (e.g., refer to FIG. 1).

The first sub-pixel SPX_R may emit light in a first wavelength band (for example, a red wavelength band). The second sub-pixel SPX_G may emit light in a second wavelength band (for example, a green wavelength band). The third sub-pixel SPX_B may emit light in a third wavelength band (for example, a blue wavelength band). The red wavelength band may be a wavelength range of approximately 600 nm to 750 nm, the green wavelength band may be a wavelength range of approximately 480 nm to 560 nm, and the blue wavelength band may be a wavelength range of approximately 370 nm to 460 nm.

Hereinafter, for convenience of description, it is assumed that the first sub-pixel SPX_R is a red sub-pixel emitting light in the red wavelength band, the second sub-pixel SPX_G is a green sub-pixel emitting light in the green wavelength band, and the third sub-pixel SPX_B is a blue sub-pixel emitting light in the blue wavelength band, but embodiments of the present disclosure are not limited thereto.

Within the pixel PXL, the plurality of sub-pixels SPX may be arranged in various ways. For example, referring to FIG. 7A, the first sub-pixel SPX_R and the third sub-pixel SPX_B may be alternately arranged along the row direction (the second direction or the X-axis direction), and the second sub-pixel SPX_G may be arranged along a row adjacent thereto. The second sub-pixel SPX_G may be disposed not to correspond to the first sub-pixel SPX_R and the third sub-pixel SPX_B.

An area of the emission area EMA of any one of the first sub-pixel SPX_R, the second sub-pixel SPX_G, or the third sub-pixel SPX_B may be different from the area of one or more of the other two sub-pixels. For example, an area of an emission area EMA_B of the third sub-pixel SPX_B may be larger than that of an emission area EMA_R of the first sub-pixel SPX_R. For example, the area of the emission area EMA_R of the first subpixel SPX_R may be larger than that of an emission area EMA_G of the second sub-pixel SPX_G. However, embodiments of the present disclosure are not limited thereto, and areas of emission areas EMA of the first sub-pixel SPX_R, the second sub-pixel SPX_G, and the third sub-pixel SPX_B may be designed to be the same.

The shape of the emission area EMA may be designed in various ways. For example, referring to FIG. 7A, the shape of the emission area EMA is shown as being octagonal, but may have a shape such as a circle, a polygon, a polygon with rounded corners, and the like.

Referring to FIG. 7A, the first sensing cell 612 may include a mesh hole MH and a body portion BP. The mesh hole MH may overlap the emission area EMA in a thickness direction (for example, the Z-axis direction). The emission area EMA of the pixel PXL may be located in an area corresponding to the mesh hole MH. An area of the mesh hole MH may be larger than that of the emission area EMA. The body portion BP may overlap the non-emission area NEM in the thickness direction (for example, the Z-axis direction). The width of the body portion BP may be smaller than that of the non-emission area NEM. Through the above structure, light emitted from the emission area EMA of the sub-pixel SPX can effectively pass through the first touch electrode TX.

Figure 7B:
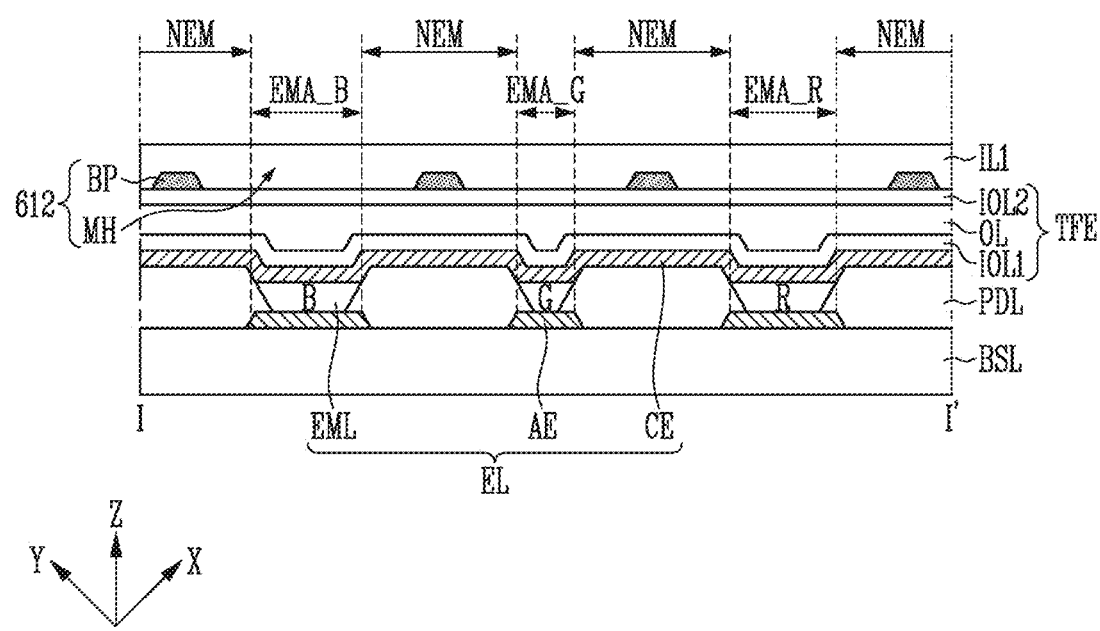
FIG. 7B is a cross-sectional view taken along line I-I' of FIG. 7A according to an embodiment.

FIG. 7B is a cross-sectional view of an embodiment taken along line I-I' of FIG. 7A. Referring to FIG. 7B, a pixel defining layer PDL, the light emitting element EL, the encapsulation layer TFE, the first sensing cell 612, and a first insulating layer IL1 may be disposed on the first base substrate BSL. The pixel defining layer PDL and the light emitting element LE may be included in the element layer DSL described above (e.g., refer to FIG. 2). The first sensing cell 612 and the first insulating layer IL1 may be included in the touch panel 110 described above (e.g., refer to FIG. 2).

The light emitting element LE may include a first electrode AE, a second electrode CE, and a light emitting layer EML. The light emitting layer EML may be disposed between the first electrode AE and the second electrode CE. The light emitting element LE may be disposed in each sub-pixel SPX.

The first electrode AE may be disposed in each sub-pixel SPX. The pixel defining layer PDL may be disposed on the first electrode AE to expose the first electrode AE. The first electrode AE may correspond to the anode electrode of the light emitting element LE. The first electrode AE may be formed of a metal layer including silver (Ag), magnesium (Mg), aluminum (Al), platinum (Pt), palladium (Pd), gold (Au), nickel (Ni), neodymium (Nd), iridium (Ir), chromium (Cr), or an alloy thereof. The first electrode AE may include indium tin oxide (ITO), indium zinc oxide (IZO), zinc oxide (ZnO), or indium tin zinc oxide (ITZO).

The pixel defining layer PDL may be disposed to overlap the non-emission area NEM. The pixel defining layer PDL may include an organic insulating layer including an organic material. The organic material may be at least one selected from the group consisting of an acrylic resin, an epoxy resin, a phenolic resin, a polyamide resin, and a polyimide resin. The pixel defining layer PDL may include a light absorbing material. The pixel defining layer PDL may include a light absorber coated to absorb external light. For example, the pixel defining layer PDL may include a carbon-based black pigment. However, the present disclosure is not limited thereto. The pixel definition layer PDL may include an opaque metal material having a high light absorption rate, such as chromium (Cr), molybdenum (Mo), an alloy of molybdenum and titanium (MoTi), tungsten (W), vanadium (V), niobium (Nb), tantalum (Ta), manganese (Mn), cobalt (Co), and nickel (Ni).

The light emitting layer EML may be disposed to overlap a region from which at least a portion of the pixel defining layer PDL is removed to expose the first electrode AE. The light emitting layer EML may include an organic light emitting layer. Depending on an organic material included in the light emitting layer EML, the light emitting layer EML may emit light of the first wavelength band (for example, the red wavelength band), light of the second wavelength band (for example, the green wavelength band), or light of the third wavelength band (for example, the blue wavelength band).

The second electrode CE may be disposed on the light emitting layer EML (for example, in the Z-axis direction). The second electrode CE may be formed (for example, entirely formed) in the emission area EML and the non-emission area NEM. The second electrode CE may correspond to the cathode electrode of the light emitting element LE. The second electrode CE may be formed of a metal layer including silver (Ag), magnesium (Mg), aluminum (Al), platinum (Pt), palladium (Pd), gold (Au), nickel (Ni), neodymium (Nd), iridium (Ir), chromium (Cr), or the like. The second electrode CE may be formed of a light-transmitting conductive layer including ITO, IZO, ZnO, or ITZO. For example, the second electrode CE may be formed of two or more multi-layers including a metal thin film layer. For example, in one embodiment, the second electrode CE may include a triple layer of ITO/Ag/ITO.

According to an embodiment, the light emitting element LE may further include a hole transport layer disposed between the first electrode AE and the light emitting layer EML and an electron transport layer disposed between the second electrode CE and the light emitting layer EML.

The encapsulation layer TFE may be disposed on the second electrode CE (for example, in the Z-axis direction). The encapsulation layer TFE may have a laminated structure in which, for example, an inorganic material, an organic material, and an inorganic material are sequentially formed. Referring to FIG. 7B, the encapsulation layer TFE may be formed by sequentially forming a first inorganic encapsulation layer IOL1 including an inorganic material, an organic encapsulation layer OL including an organic material, and an inorganic encapsulation layer IOL2 including an inorganic material. The encapsulation layer TFE may serve to protect the light emitting element EL (for example, the light emitting layer EML) disposed thereunder from external moisture and/or oxygen.

The body portion BP of the first sensing cell 612 may be disposed on the encapsulation layer TFE. A first insulating layer IL1 may be disposed on a first body portion BP. The first insulating layer IL1 may insulate touch electrodes from each other. Referring to FIG. 5 together, the plurality of first touch electrodes Tx1 to Txm may be insulated from each other by the first insulating layer IL1. The plurality of second touch electrodes Rx1 to Rxn may be insulated from each other by the first insulating layer IL1.

Referring to FIG. 6 together, the first connection electrode 614 and the second connection electrode 624 may be insulated from each other by the first insulating layer IL1. For example, the first connection electrode 614 and the second connection electrode 624 may be disposed to overlap each other in the thickness direction (for example, the Z-axis direction) with the first insulating layer IL1 interposed therebetween.

The mesh hole MH of the first sensing cell 612 may be disposed to overlap the emission area EMA.

Figure 8A:
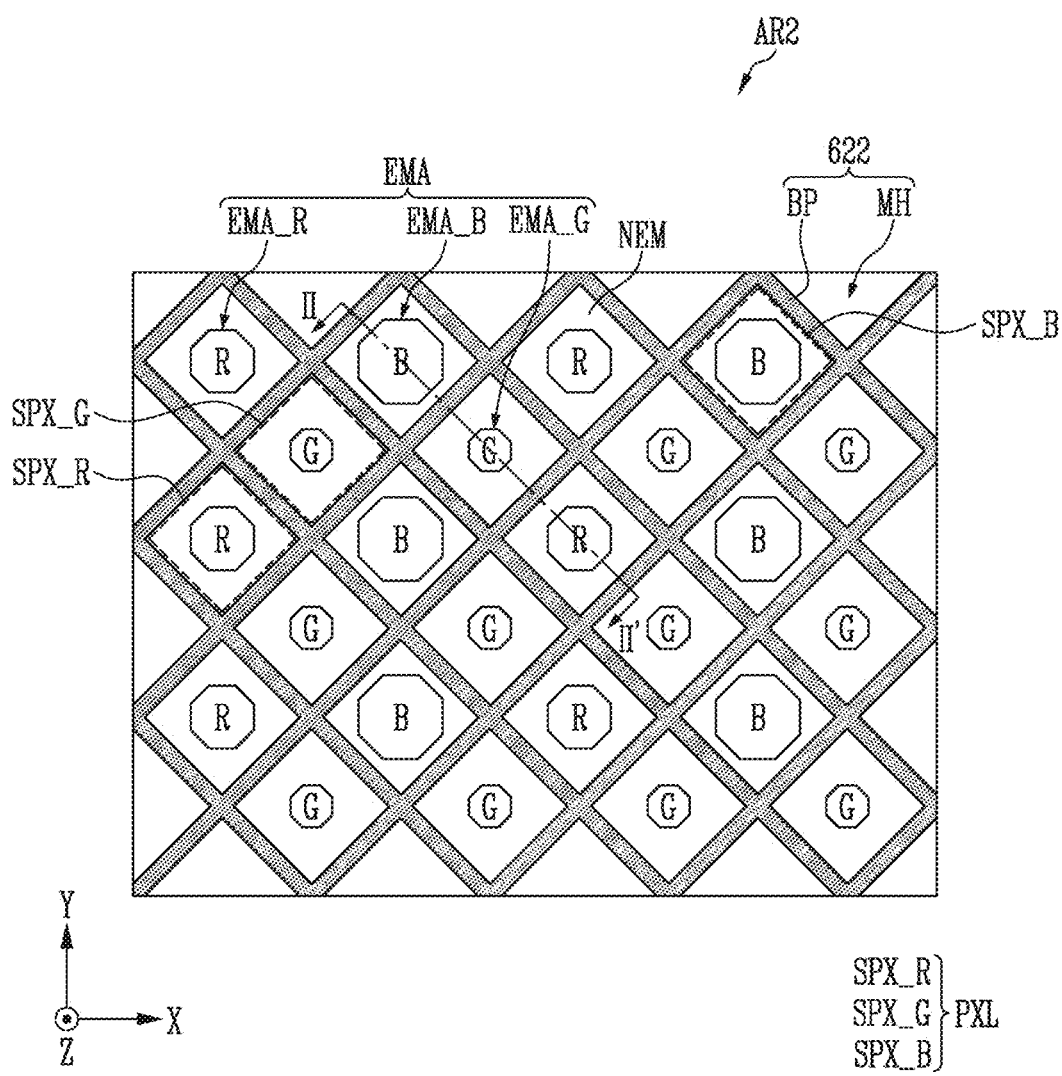
FIG. 8A is an enlarged view of a second region of FIG. 6 according to an embodiment.

FIG. 8A is an enlarged view of a second region AR2 of FIG. 6 according to an embodiment. Comparing FIG. 8A with 7A, the description of the first sensing cell 612 may be similar to a description of the second sensing cell 622. The second sensing cell 622 may include a body portion BP and a mesh hole MH. A description of the remaining components may be the same as those described with reference to FIG. 7A.

Figure 8B:
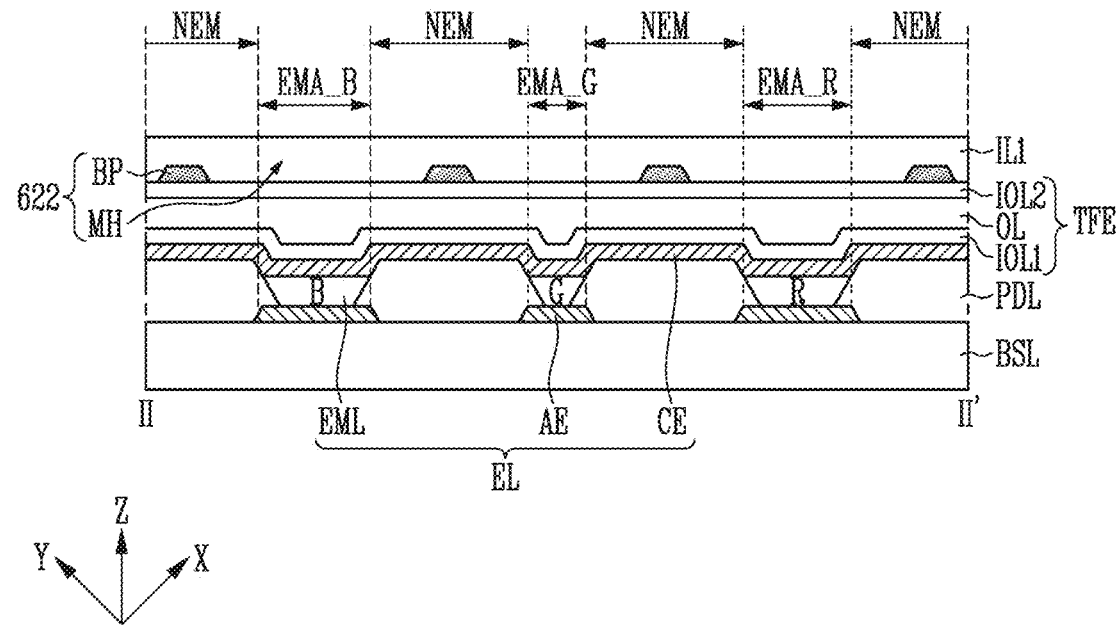
FIG. 8B is a cross-sectional view taken along line II-II' of FIG. 8A according to an embodiment.

FIG. 8B is a cross-sectional view taken along line II-II' of FIG. 8A according to an embodiment. Comparing FIG. 8B with FIG. 7B, the description of the first sensing cell 612 may be similar to a description of the second sensing cell 622. The body portion BP of the second sensing cell 622 may be covered with the first insulating layer IL1. According to an embodiment, the body portion BP of the second sensing cell 622 may be disposed on the first insulating layer IL1. Hereinafter, for convenience of description, an embodiment in which the body portion BP of the second sensing cell 622 is covered with the first insulating layer IL1 will be described as an example, but embodiments of the present disclosure are not limited thereto.

Figure 9:
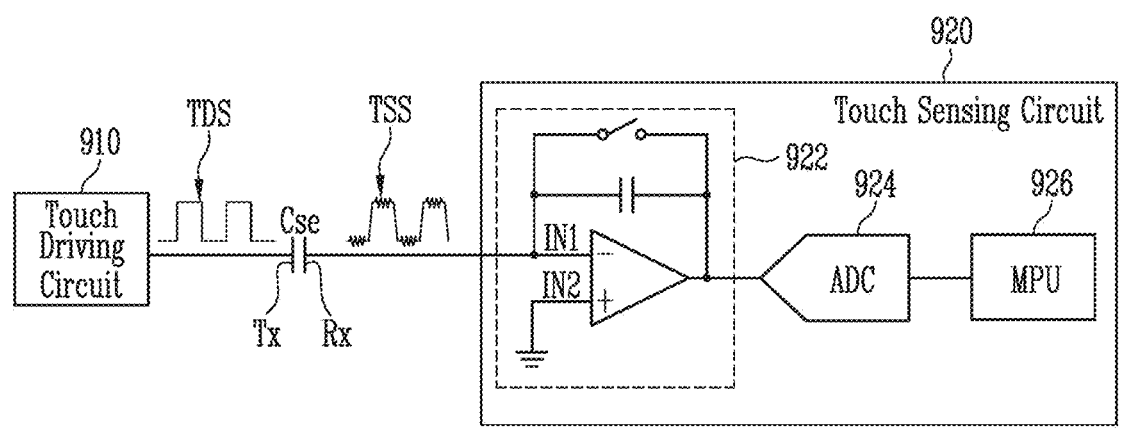
FIG. 9 is a diagram for explaining the touch circuit of FIG. 5 according to an embodiment.

FIG. 9 is a diagram for explaining operation of the touch circuit 130 of FIG. 5 according to an embodiment.

Referring to FIG. 9, the touch circuit 130 may include a touch driving circuit 910 and a touch sensing circuit 920. The touch driving circuit 910 may generate a touch driving signal TDS. The touch driving signal TDS may be implemented to have a predetermined waveform, e.g., a square wave. However, according to an embodiment, the touch driving signal TDS may be implemented as a sine wave or may have another type of waveform. The touch driving signal TDS may be input to the first touch electrode Tx.

The capacitance Cse may be formed by the first touch electrode Tx and the second touch electrode Rx, as previously discussed. The touch sensing signal TSS corresponding to the touch driving signal TDS may be output from the second touch electrode Rx by the touch driving signal TDS supplied to the first touch electrode Tx. The touch sensing signal TSS may be input to the touch sensing circuit 920. The touch sensing circuit 920 may amplify, convert, and signal process the touch sensing signal TSS input from the second touch electrode Rx. The touch sensing circuit 920 may detect a touch input and/or touch coordinates according to a result of the signal processing.

The touch sensing circuit 920 may include a signal receiving unit (or signal receiver) 922, an analog to digital converter (ADC) 924, and a signal processing unit (or signal processor) 926. The signal receiving unit 922 may receive the touch sensing signal TSS from the second touch electrode Rx. The signal receiving unit 922 may amplify and output the touch sensing signal TSS. As an example, the signal receiving unit 922 may be implemented as an analog front end (AFE) including an operational amplifier (OP-Amp). According to an embodiment, a first input terminal IN1 (for example, an inverting input terminal "(−)" of an operational amplifier) of the signal receiving unit 922 may be electrically connected to the second touch electrode Rx. A second input terminal IN2 (for example, a non-inverting input terminal "(+)" of the operational amplifier) of the signal receiving unit 922 may be electrically connected to a ground terminal. A ground voltage may be input to the second input terminal IN2 of the signal receiving unit 922.

The analog-to-digital converter 924 may convert an analog signal input from the signal receiving unit 922 into a digital signal. According to an embodiment, the number of analog-to-digital converters 924 may be provided correspond to the number of second touch electrodes Rx, e.g., may be provided in one-to-one correspondence. Each analog-to-digital converter 924 may further correspond to each sensing channel corresponding to the second touch electrode Rx. According to an embodiment, the analog-to-digital converter 924 may be configured so that the plurality of second touch electrodes Rx share one analog-to-digital converter 924. In this case, a switching circuit (for example, a 1: N multiplexer) may be provided between the signal receiving unit 922 and the analog-to-digital converter 924.

The signal processing unit 926 may process the signal (for example, digital signal) converted by the analog-to-digital converter 924, and detect a touch input and/or touch coordinates according to the result of the signal processing. As an example, the signal processing unit 926 may comprehensively analyze a signal (for example, the amplified and converted touch sensing signal TSS), input from the plurality of first touch electrodes Tx via the signal receiving unit 922 and the analog-to-digital converter 924, to detect the touch input and the position thereof. According to an embodiment, the signal processing unit 926 may be implemented as a microprocessor unit (MPU). In this case, a memory used to drive the signal processing unit 926 may be additionally provided inside the touch sensing circuit 920. However, the configuration of the signal processing unit 926 is not limited thereto. As another example, the signal processing unit 926 may be implemented as a microcontroller unit (MCU) or the like.

Figure 10:
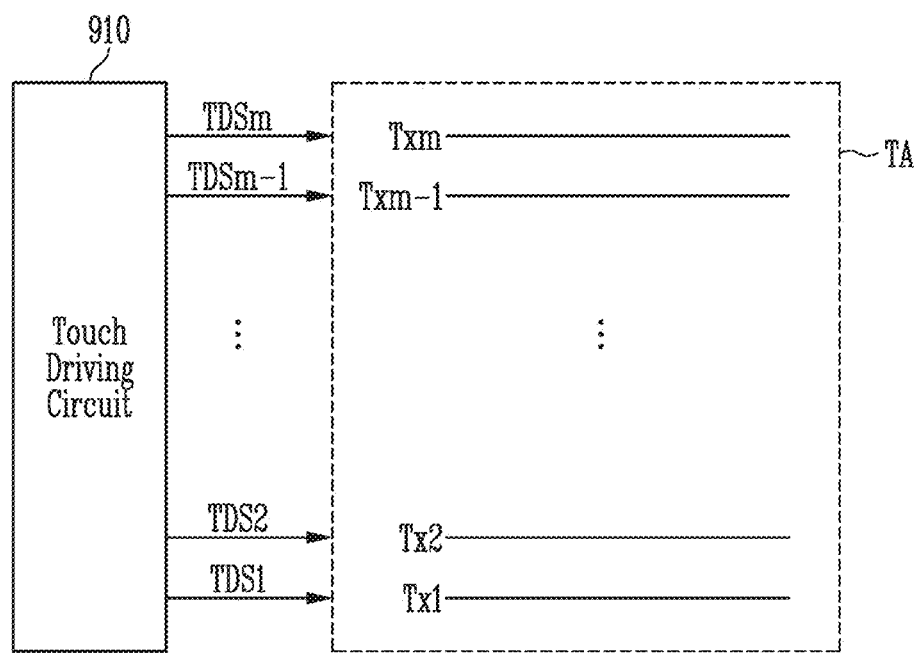
FIG. 10 is a diagram illustrating an example of a touch driving circuit of FIG. 9 according to an embodiment.

FIG. 10 is a diagram illustrating an example of a touch driving circuit 910 of FIG. 9 according to an embodiment. The touch driving circuit 910 may drive the plurality of first touch electrodes Tx1 to Txm disposed in the touch active area TA. Referring to FIG. 10, the touch driving circuit 910 may supply a plurality of touch driving signals TDS1 to TDSm to respective ones of the plurality of first touch electrodes Tx1 to Txm.

The touch driving circuit 910 according to embodiments of the present disclosure may sequentially drive the plurality of first touch electrodes Tx1 to Txm. For example, the touch driving circuit 910 may input the touch driving signal TDS1 to a first (1$^{st}$) first touch electrode Tx1, input the touch driving signal TDS2 to a second first touch electrode Tx2, and input the touch driving signal TDSm to an m-th first touch electrode Txm. For example, the touch driving circuit 910 may input the touch driving signal TDSm to the m-th first touch electrode Txm, input the touch driving signal TDSm-1 to an (m−1)th first touch electrode Txm-1, and input the touch driving signal TDS1 to the first (1$^{st}$) first touch electrode Tx1.

The touch driving circuit 910 according to embodiments of the present disclosure may simultaneously drive two or more first touch electrodes among the plurality of first touch electrodes Tx1 to Txm. For example, the touch driving circuit 910 may input the touch driving signals TDS1 and TDS2 to the first (1$^{st}$) first touch electrode Tx1 and the second first touch electrode Tx2, respectively.

The touch driving circuit 910 according to embodiments of the present disclosure may input the same touch driving signal to the plurality of first touch electrodes Tx1 to Txm. For example, the touch driving signal TDS1 input to the first (1$^{st}$) first touch electrode Tx1 may have the same frequency as the touch driving signals TDS2 to TDSm input to the second to m-th first touch electrodes Tx2 to Txm.

The touch driving circuit 910 according to embodiments of the present disclosure may input different touch driving signals to at least two of the plurality of first touch electrodes Tx1 to Txm. For example, the touch driving signal TDS1 input to the first (1$^{st}$) first touch electrode Tx1 and the touch driving signal TDS2 input to the second first touch electrode Tx2 may have different frequencies. In an embodiment, the touch driving circuit 910 may input touch driving signals having different frequencies to the plurality of first touch electrodes Tx1 to Txm.

Figure 11:
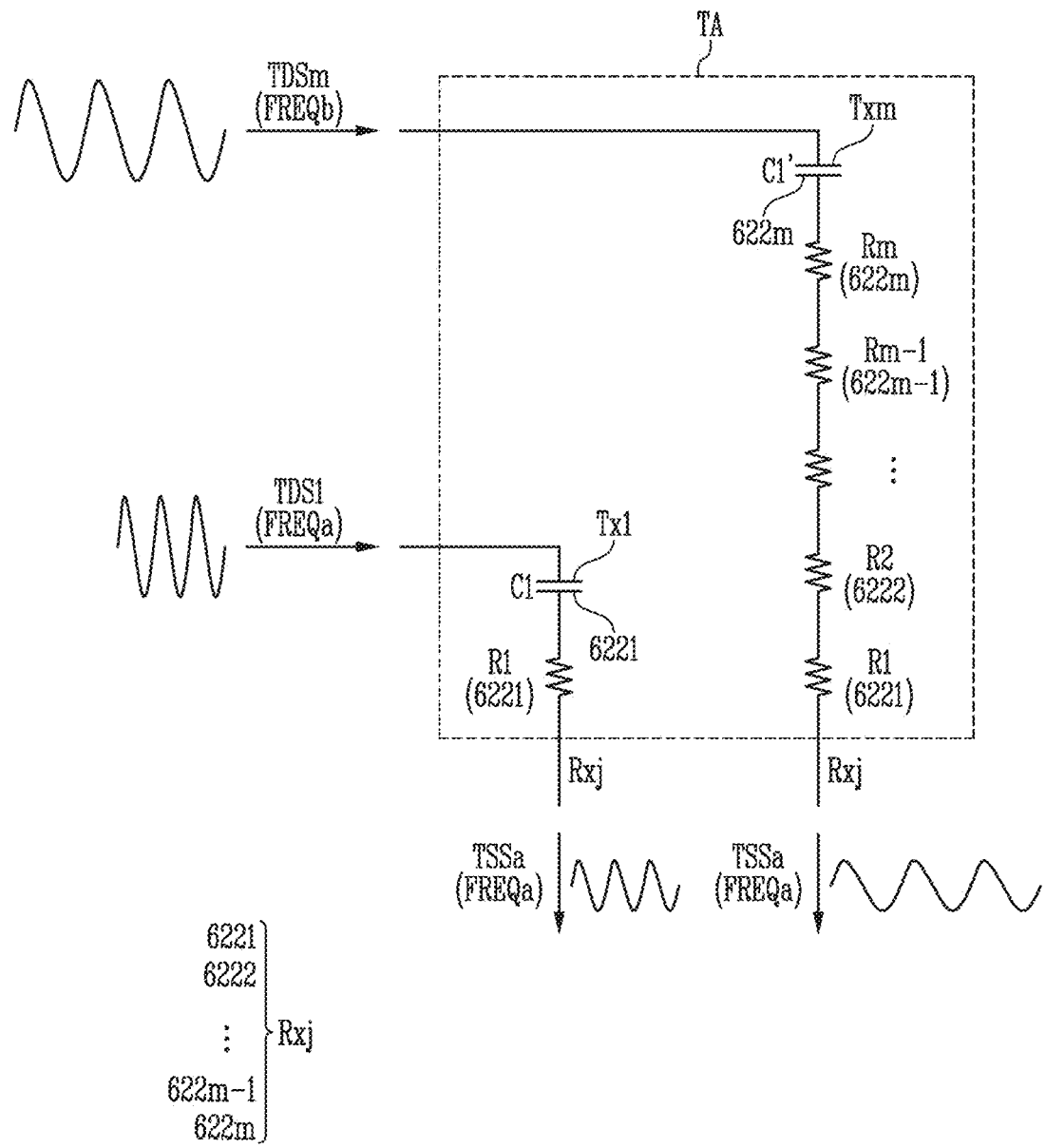
FIG. 11 is a diagram for explaining an embodiment in which touch driving signals having different frequencies are input according to positions of first touch electrodes.

FIG. 11 is a diagram for explaining an embodiment in which touch driving signals having different frequencies are input according to positions of first touch electrodes Tx.

Referring to FIG. 11, a time constant may vary according to the position of the first touch electrode Tx in the touch active area TA. The time constant may be calculated as the product of resistance R and capacitance C. The time constant may vary according to the distance from a terminal through which the touch sensing signal TSS is output to the first touch electrode Tx.

A time constant τ between the first (1$^{st}$) first touch electrode Tx1 and a second touch electrode Rxj may be calculated based on Equation 1 below, where j may be an integer equal to or greater than 1 and equal to or less than n.

$$\tau = R1 \times C1 \qquad (1)$$

where R1 may be a resistance of a first second sensing cell 6221 of the second touch electrode Rxj, and C1 may be a capacitance formed between the first (1$^{st}$) first touch electrode Tx1 and the first second sensing cell 6221 of the second touch electrode Rxj.

The time constant τ between the m-th first touch electrode Txm and the second touch electrode Rxj may be calculated based on Equation 2.

$$\tau = C1' \times \sum_{i=1}^{m}(Ri) \qquad (2)$$

where Ri may be a resistance of an i-th second sensing cell 622$i$ of the second touch electrode Rxj, where i may be an integer equal to or greater than 1 and equal to or less than m, and C1' may be a capacitance formed between the m-th first touch electrode Txm and an m-th second sensing cell 622*m* of the second touch electrode Rxj.

Assuming that C1 in Equation 1 and C1' in Equation 2 are substantially the same, and assuming that resistances R1 to Rm of each of the second sensing cells 6221 to 622*m* are substantially the same, the time constant may increase in proportion to the position of the first touch electrode Tx.

Therefore, the touch driving signal TDS1 of a first frequency FREQa may be input to the first touch electrode (for example, Tx1) positioned close to a pad from which the touch sensing signal TSS is output. The touch driving signal TDSm of a second frequency FREQb may be input to the first touch electrode (for example, Txm) positioned far from the pad from which the touch sensing signal TSS is output. The first frequency FREQa may be set higher than the second frequency FREQb.

Figure 12:
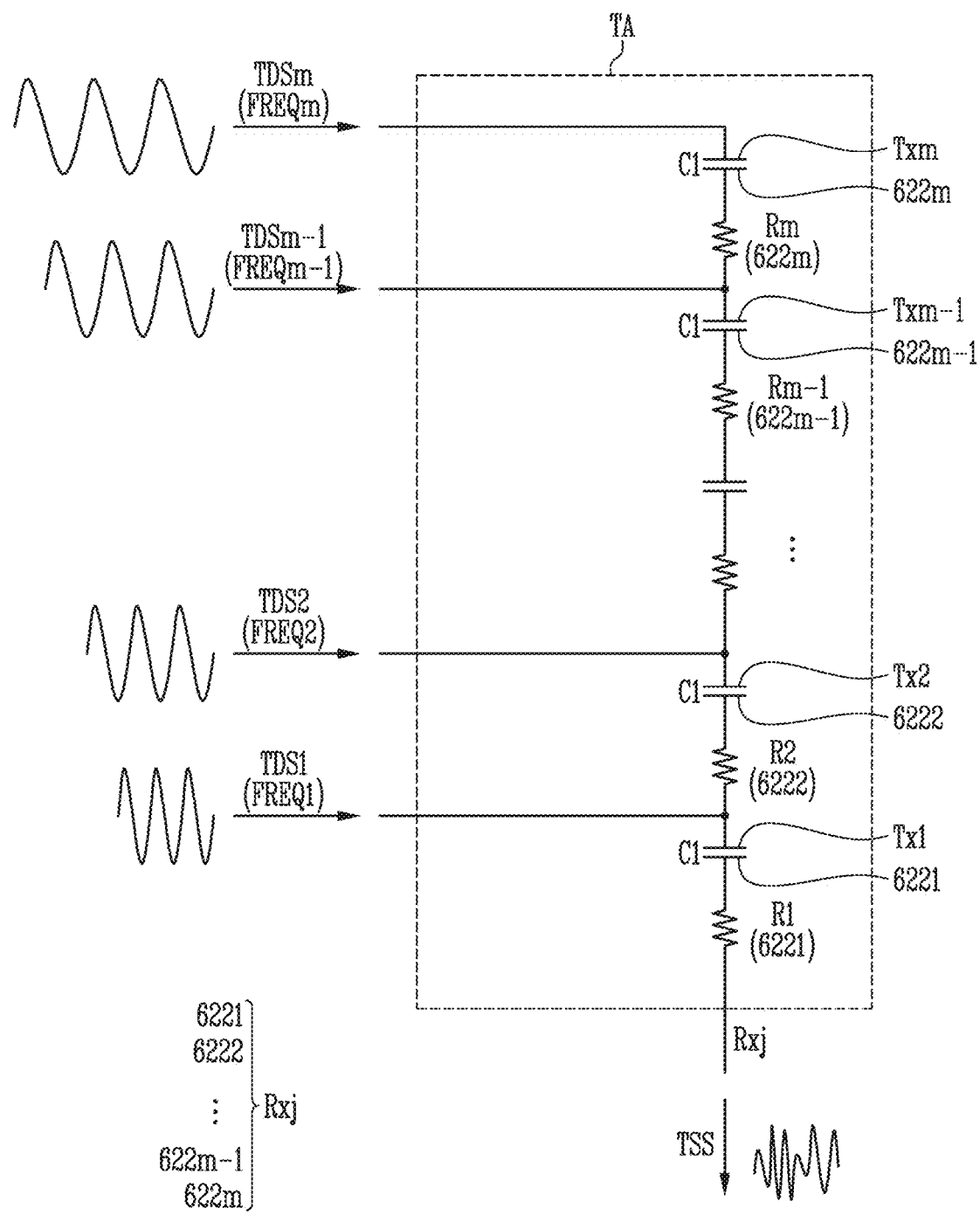
FIG. 12 is a diagram illustrating an example of a touch sensing signal generated when touch driving signals having different frequencies are simultaneously input to a plurality of first touch electrodes according to an embodiment.

FIG. 12 is a diagram illustrating an example embodiment of a touch sensing signal TSS generated when touch driving signals TDS1 to TDSm having different frequencies are simultaneously input to a plurality of first touch electrodes Tx1 to Txm.

Referring to FIG. 12, the touch driving signals TDS1 to TDSm having different frequencies may be input to the plurality of first touch electrodes Tx1 to Txm. A capacitance may be formed between the plurality of first touch electrodes Tx1 to Txm and the second sensing cells 6221 to 622*m*.

The plurality of touch driving signals TDS1 to TDSm may be simultaneously input to the plurality of first touch electrodes Tx1 to Txm. For example, the touch driving circuit 910 described above (e.g., refer to FIGS. 9 and 10) may output the plurality of touch driving signals TDS1 to TDSm. For example, in a state where the touch driving circuit is not connected (for example, electrically connected) to the touch panel 110 (e.g., refer to FIG. 6), the plurality of touch driving signals TDS1 to TDSm may be input to the pad unit 520 (e.g., refer to FIGS. 5 and 6) through an external component (for example, a panel inspection device).

The touch driving signal TDS1 input to the first (1st) first touch electrode Tx1 may have a first frequency FREQ1. The touch driving signal TDS2 input to the second first touch electrode Tx2 may have a second frequency FREQ2. The touch driving signal TDSm input to the m-th first touch electrode Txm may have an m-th frequency FREQm.

As the distance between the first touch electrode Tx and the pad from which the touch sensing signal TSS is output increases, the frequency of the touch driving signal TDS may gradually decrease. For example, the first frequency FREQ1 may be greater than the second frequency FREQ2. For example, an (m−1)th frequency FREQm-1 may be greater than the m-th frequency FREQm.

The touch sensing signal TSS output from the second touch electrode Rxj may be a signal generated by adding the touch driving signals TDS1 to TDSm having the first to m-th frequencies.

Figure 13:
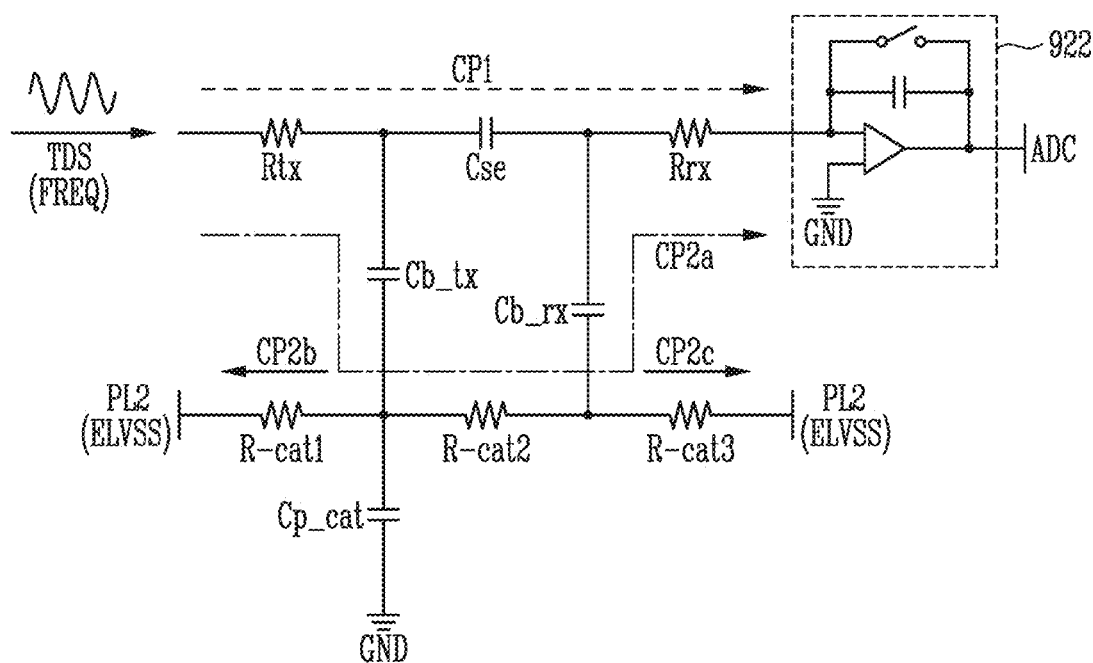
FIG. 13 is an equivalent circuit diagram of the touch panel of FIG. 1 according to an embodiment.

FIG. 13 is an equivalent circuit diagram of the touch panel 110 of FIG. 1 according to an embodiment. Components of the equivalent circuit diagram of FIG. 13 will be described with reference to the above-described drawings.

Referring to FIG. 13, Rtx may correspond to a resistance of the first touch electrode Tx to which the touch driving signal TDS is input, Rrx may correspond to a resistance of the second touch electrode Rx from which the touch sensing signal TSS is output, and Cse may correspond to a capacitance value formed between the first touch electrode Tx and the second touch electrode Rx.

In addition, R-cat may correspond to a resistance of the common electrode (for example, the cathode electrode). When the embodiments of the present disclosure are implemented as a self-light emitting display device including the light emitting element LE (e.g., refer to FIG. 4), R-cat may correspond to the resistance of the common electrode (that is, the cathode electrode or the second electrode CE) of the light emitting element LE. When the embodiments of the present disclosure are implemented as a non-light emitting display device such as a liquid crystal display device, R-cat may correspond to a resistance of a common electrode for providing a voltage difference with a pixel electrode.

Hereinafter, for convenience of description, as embodiments of the present disclosure, a case of the self-light emitting display device including the light emitting element will be described as an example. It is assumed that R-cat corresponds to the resistance of the second electrode CE of the light emitting element LE, but embodiments of the present disclosure are not limited thereto. For example, R-cat may correspond to the resistance of the common electrode of the liquid crystal display.

Referring again to FIG. 13, R-cat1 may correspond to the resistance of the second electrode CE of the light emitting element LE positioned in an area overlapping the first touch electrode Tx. R-cat2 may correspond to the resistance of the second electrode CE of the light emitting element LE positioned in an area (for example, the overlapping area OLA) overlapping the first touch electrode Tx and the second touch electrode Rx. R-cat3 may correspond to the resistance of the second electrode CE of the light emitting element LE positioned in an area overlapping the second touch electrode Rx.

In addition, Cb_tx may correspond to a capacitance formed between the first touch electrode Tx indicated by Rtx and the second electrode CE of the light emitting element LE indicated by R-cat1. Cb_rx may correspond to a capacitance formed between the second touch electrode Rx indicated by Rrx and the second electrode CE of the light emitting element LE indicated by R-cat3. Cb_tx and Cb_rx may be intended basic capacitance and may be different from unintended parasitic capacitance. Accordingly, Cb_tx and Cb_rx may be designed to have predetermined values according to design by those skilled in the art. CP_cat may correspond to a capacitance between the second electrode CE of the light emitting element LE and the ground GND. CP_cat may be a parasitic capacitance.

Referring to FIG. 13, a current may be input to the signal receiving unit 922 by the touch driving signal TDS through the following two current paths CP. A first current path CP1 may be a path determined by the capacitance Cse formed between the first touch electrode Tx and the second touch electrode Rx. A second current path CP2*a* may be determined by the capacitance Cb_tx formed between the first touch electrode Tx and the second electrode CE of the light emitting element LE and the capacitance Cb_rx formed between the second touch electrode Rx and the second electrode CE of the light emitting element LE.

A current value input to the signal receiving unit 922 through the second current path CP2*a* may be influenced by a resistance value of the second electrode CE of the light emitting element LE. For example, the magnitude of current sinking into the second power source line PL2 through peripheral current paths CP2*b* and CP2*c* may vary, and thus the current value input to the signal receiving unit 922 may vary.

For example, when the thickness of the second electrode CE of the light emitting element LE decreases (for example, when the second electrode CE is not properly formed), the resistance of the second electrode CE may increase. As an example, when the thickness of the second electrode CE of the light emitting element LE disposed to overlap the first touch electrode Tx decreases, the resistance value indicated by R-cat1 may increase. Accordingly, the magnitude of current sinking through the first peripheral path CP2*b* may decrease and thus the current value input to the signal receiving unit 922 may increase. As an example, when the thickness of the second electrode CE of the light emitting element LE disposed to overlap the second touch electrode Rx decreases, the resistance value indicated by R-cat3 may increase, for example, above a predetermined level. Accordingly, the magnitude of current sinking through the second peripheral path CP2*c* may decrease, and thus the current value input to the signal receiving unit 922 may increase.

Based on this understanding, the display device 100 according to the embodiments of the present disclosure may detect the location of an area where the second electrode CE of the light emitting element LE is poorly formed using the touch sensing signal TSS.

Figure 14:
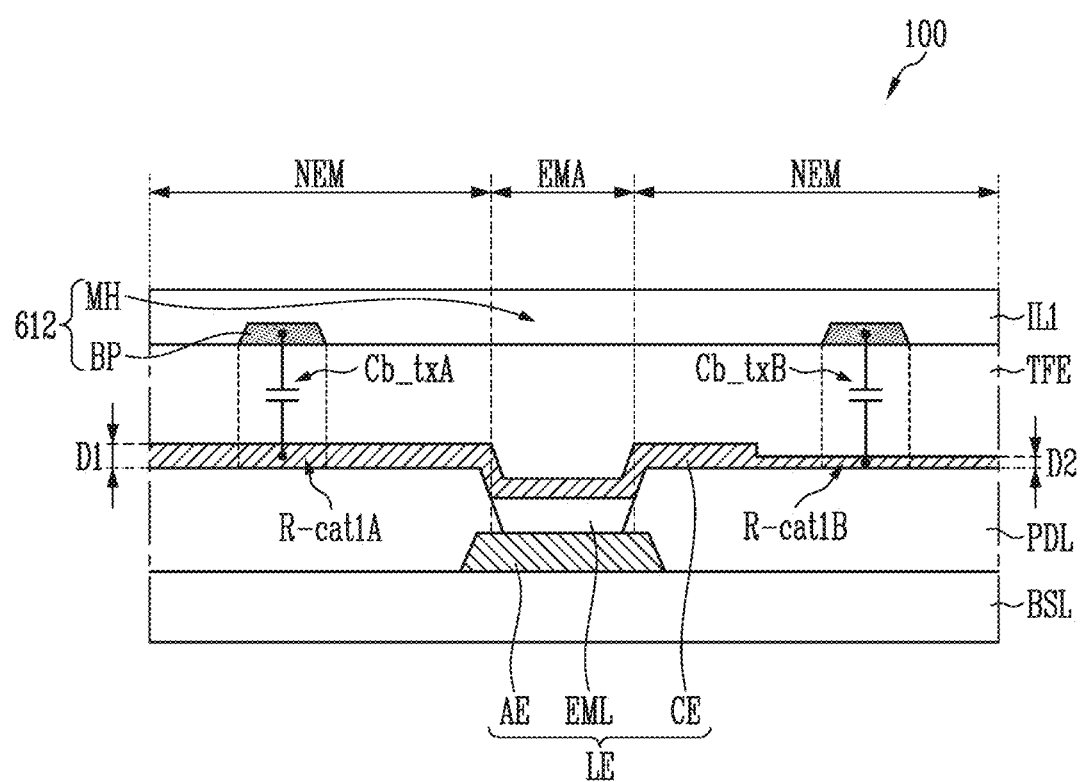
FIG. 14 is a cross-sectional view for explaining an example of the equivalent circuit diagram of FIG. 13 in relation to the display device of FIG. 1 according to an embodiment.

FIG. 14 is a cross-sectional view for explaining an example embodiment of the equivalent circuit diagram of FIG. 13 in relation to the display device 100 of FIG. 1.

Referring to FIG. 14, the capacitance Cb_tx between the body portion BP of the first sensing cell 612 and the second electrode CE of the light emitting element LE is shown. Depending on the thickness of the second electrode CE, the resistance value of the second electrode CE indicated by R-cat1 may vary.

In an area where the thickness of the second electrode CE is a first size D1, the resistance of the second electrode CE may be indicated by R-cat1A and the capacitance formed between the body portion BP and the second electrode CE may be indicated by Cb_txA. In an area where the thickness of the second electrode CE is a second size D2, the resistance of the second electrode CE may be indicated by R-cat1B and the capacitance formed between the body portion BP and the second electrode CE may be indicated by Cb_txB.

The area where the thickness of the second electrode CE is the first size D1 may correspond to an area where the second electrode CE is formed well, and the time constant t in the corresponding area may be expressed based on Equation 3 below.

$$\tau = (R\text{-cat1}A) \times (\text{Cb\_txA}) \tag{3}$$

where R-cat1A corresponds to the resistance and Cb_txA may corresponds to the capacitance.

The area where the thickness of the second electrode CE is the second size D2 may correspond to an area where the second electrode CE is poorly formed, and the time constant τ in the corresponding area may be expressed based on Equation 4 below.

$$\tau = (R\text{-cat1}B) \times (\text{Cb\_txB}) \tag{4}$$

where R-cat1B corresponds to the resistance and Cb_txB corresponds to the capacitance.

Compared to Equation 3, both resistance and capacitance may increase. In particular, as the thickness of the second electrode CE decreases, an R-cat1B value corresponding to the resistance may increase significantly. Accordingly, the magnitude of current input to the signal receiving unit 922 (e.g., refer to FIG. 13) may increase in the area where the second electrode CE is poorly formed. A detector (or processor 926 or another processor) of the touch sensing circuit may determine this current magnitude to detect information indicative of the thickness of the second electrode CE, and thus whether the second electrode is poorly formed.

Figure 15:
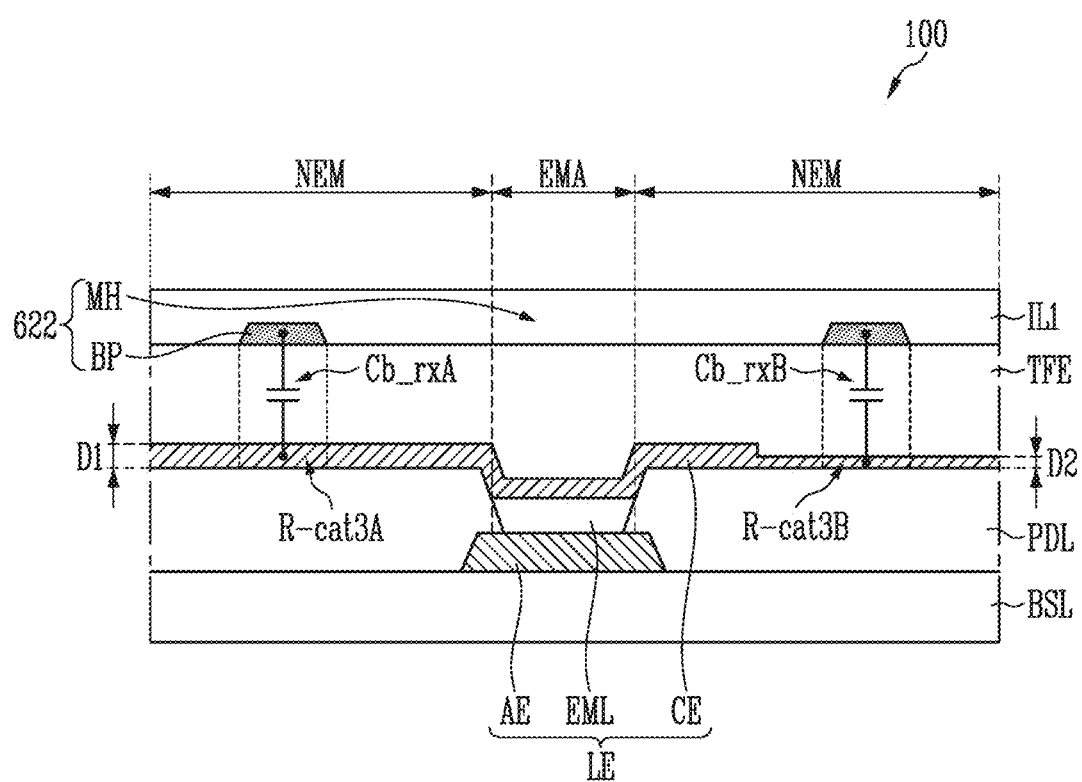
FIG. 15 is a cross-sectional view for explaining another example of the equivalent circuit diagram of FIG. 13 in relation to the display device of FIG. 1 according to an embodiment.

FIG. 15 is a cross-sectional view for explaining another example embodiment of the equivalent circuit diagram of FIG. 13 in relation to the display device 100 of FIG. 1.

Referring to FIG. 15, the capacitance Cb_rx between the body portion BP of the second sensing cell 622 and the second electrode CE of the light emitting element LE is shown. Depending on the thickness of the second electrode CE, the resistance value of the second electrode CE indicated by R-cat3 may vary.

In the area where the thickness of the second electrode CE is the first size D1, the resistance of the second electrode CE may be indicated by R-cat3A and the capacitance formed between the body portion BP and the second electrode CE may be indicated by Cb_rxA. In the area where the thickness of the second electrode CE is the second size D2, the resistance of the second electrode CE may be indicated by R-cat3B and the capacitance formed between the body portion BP and the second electrode CE may be indicated by Cb_rxB.

The area where the thickness of the second electrode CE is the first size D1 may correspond to the area where the second electrode CE is formed well, and the time constant t in the corresponding area may be expressed based on Equation 5 below.

$$\tau = (R\text{-cat3}A) \times (\text{Cb\_rxA}) \tag{5}$$

where R-cat3A corresponds to the resistance and Cb_rxA corresponds to the capacitance.

The area where the thickness of the second electrode CE is the second size D2 may correspond to the area where the second electrode CE is poorly formed, and the time constant τ in the corresponding area may be expressed based on Equation 6 below.

$$\tau = (R\text{-cat3}B) \times (\text{Cb\_rxB}) \tag{6}$$

where R-cat3B corresponds to the resistance and Cb_rxB corresponds to the capacitance.

Compared to Equation 5, both resistance and capacitance may increase. In particular, as the thickness of the second electrode CE decreases, an R-cat3B value corresponding to the resistance may increase significantly. Accordingly, the magnitude of current input to the signal receiving unit 922 (e.g., refer to FIG. 13) may increase in the area where the second electrode CE is poorly formed. A detector (or processor 926 or another processor) of the touch sensing circuit may determine this current magnitude to detect information indicative of the thickness of the second electrode CE, and thus whether the second electrode is poorly formed.

Figure 16:
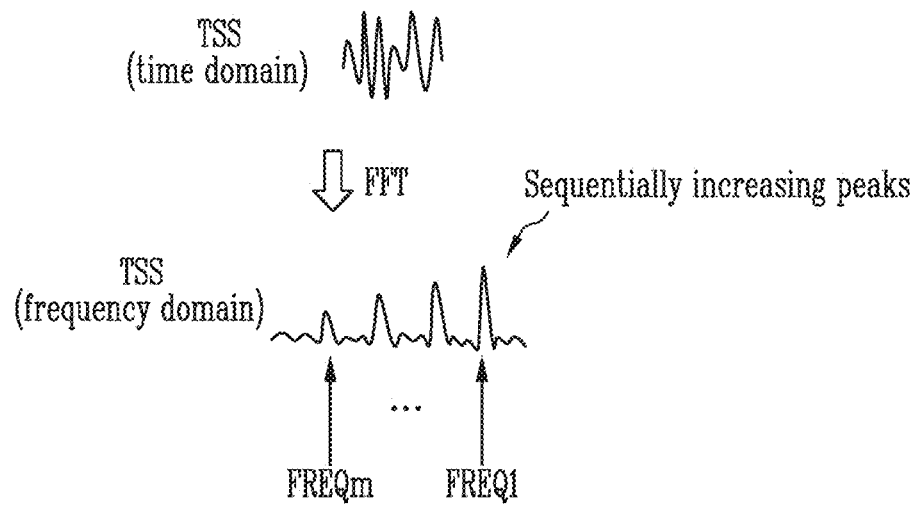
FIG. 16 is a diagram illustrating an example in which a touch sensing signal is fast Fourier transformed in a first case according to an embodiment.
Figure 17:
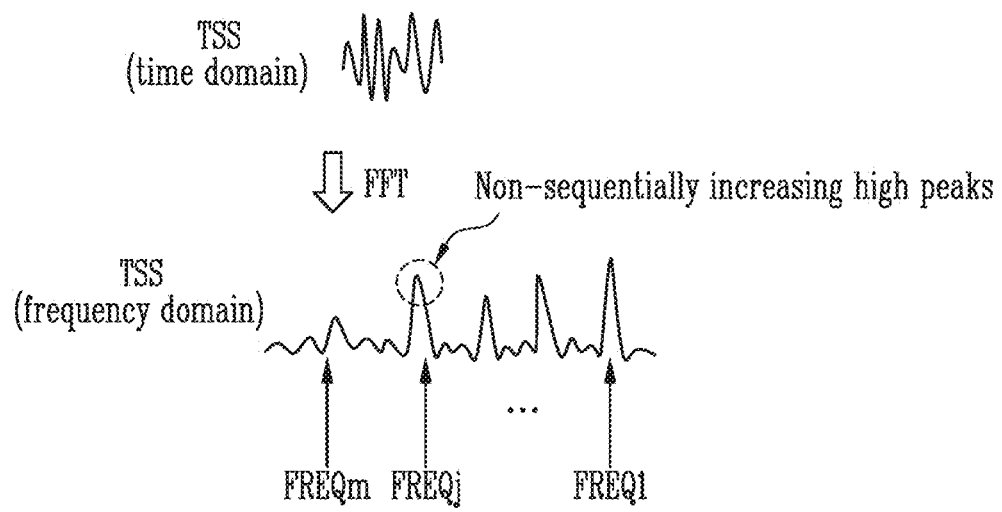
FIG. 17 is a diagram illustrating an example in which a touch sensing signal is fast Fourier transformed in a second case according to an embodiment.
Figure 18:
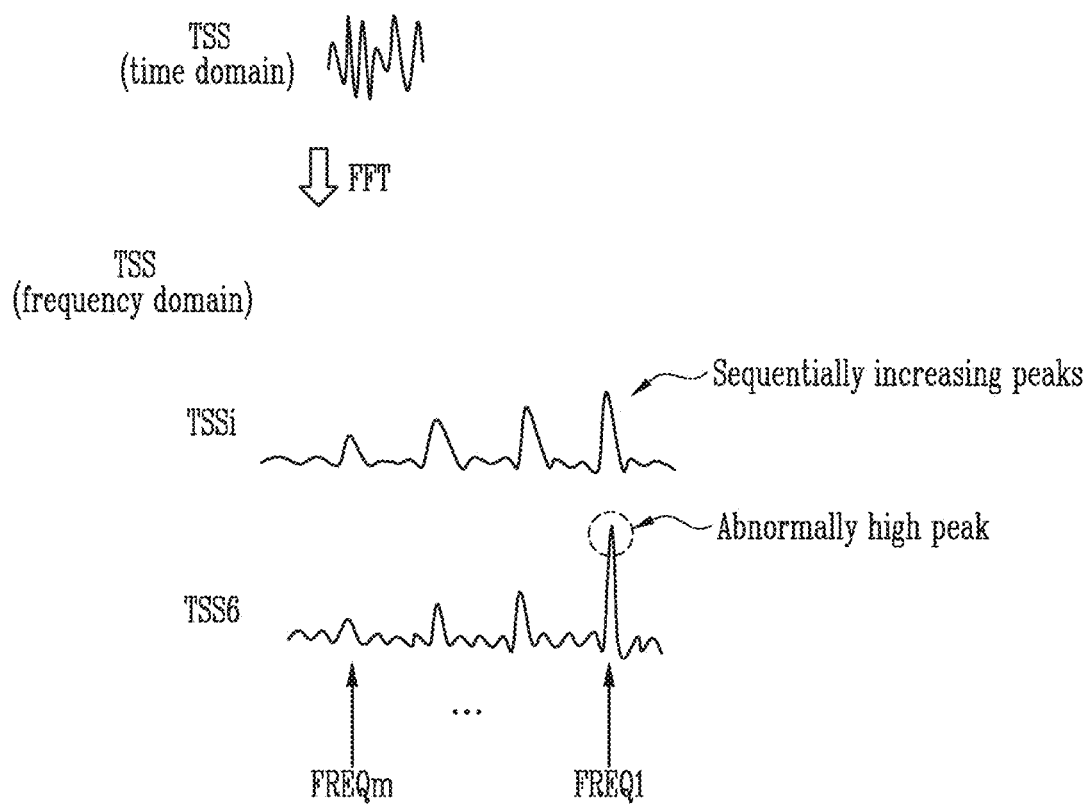
FIG. 18 is a diagram illustrating an example in which a touch sensing signal is fast Fourier transformed in a third case according to an embodiment.

FIG. 16 is a diagram illustrating an example embodiment in which a touch sensing signal TSS is subject to a fast Fourier transformation in a first case (Case 1). FIG. 17 is a diagram illustrating an example embodiment in which a touch sensing signal TSS is fast Fourier transformed in a second case (Case 2). FIG. 18 is a diagram illustrating an example embodiment in which a touch sensing signal TSS is fast Fourier transformed in a third case (Case 3). Hereinafter, embodiments of the present disclosure will be described with reference to FIGS. 12 to 15 together.

The touch sensing signal TSS acquired through the signal receiving unit 922 may be observed as a waveform in a time domain. The acquired touch sensing signal TSS may be converted into a waveform in a frequency domain by performing a Fast Fourier Transform (FFT). According to this, the touch sensing signal TSS may have a relatively large amplitude (that is, peak) in a region corresponding to the frequency of the touch driving signals TDS1 to TDSm.

The first case (Case 1) may be a case where the second electrode CE is formed well. When the second electrode CE is formed well, peaks of the touch sensing signal TSS in the frequency domain may have a sequentially increasing waveform. As described above through Equation 2, since the touch driving signal TDSm corresponding to the m-th frequency FREQm has a large time constant, a peak in the touch sensing signal TSS may be relatively small. As described above through Equation 1, since the touch driving signal TDS1 corresponding to the first frequency FREQ1 has a small time constant, a peak in the touch sensing signal TSS may be relatively large. Accordingly, when the second electrode CE is formed well, the peak of the touch sensing signal TSS may have a sequentially increasing waveform. A detector or processor of the touch sensing circuit may detect this sequentially increasing waveform (e.g.,. peaks) to determine that the second electrode CE is formed well.

The second case (Case 2) may be a case where the second electrode CE is formed poorly in a direction in which the first touch electrode Tx extends. For example, when the second electrode CE is formed poorly in an area overlapping an j-th first touch electrode Txj, the resistance value of the second electrode CE may increase in the corresponding area. Accordingly, in the touch sensing signal TSS, a peak corresponding to a frequency FREQj of a corresponding touch driving signal may increase. The peak of the touch sensing signal TSS converted to the frequency domain may increase non-sequentially. In this case, it may be detected that the second electrode CE is formed poorly in an area overlapping the first touch electrode Tx to which the touch driving signal of the corresponding frequency FREQj is input. A detector or processor of the touch sensing circuit may detect this non-sequentially increasing waveform (e.g., peaks) to determine that the second electrode CE is formed poorly.

The third case (Case 3) may be a case where the second electrode CE is formed poorly in a direction in which the second touch electrode Rx extends. For example, when the second electrode CE is formed poorly in an area overlapping a sixth second touch electrode Rx6, the resistance value of the second electrode CE may increase in the corresponding area. Referring to FIG. 18, a touch sensing signal TSS6 output from the sixth second touch electrode Rx6 may have a higher peak compared to the touch sensing signal TSSi output from another second touch electrode (for example, an i-th second touch electrode Rxi). For example, the higher peak may be detected as being greater than a predetermined level. In this case, it may be detected that the second electrode CE is formed poorly in an area overlapping the second touch electrode Rx outputting the corresponding touch sensing signal TSS. A detector or processor of the touch sensing circuit may detect this higher peak to determine that the second electrode CE is formed poorly.

FIG. 19A is a table illustrating an example of an amplitude of the touch sensing signal in the first case. Values shown in the table of FIG. 19A represent relative amplitudes (or peaks) of waveforms obtained by converting the touch sensing signal TSS of the first case (Case 1) described with reference to FIG. 16 into the frequency domain.

Six first touch electrodes Tx1 to Tx6 are shown as an example, and frequencies of the touch driving signals input to the first touch electrodes Tx1 to Tx6 may correspond to first to sixth frequencies FREQ1 to FREQ6, respectively. Six second touch electrodes Rx1 to Rx6 are shown as an example, and the touch sensing signals output from the second touch electrodes Rx1 to Rx6 may include signals of the first to sixth frequencies FREQ1 to FREQ6.

In the first case, the amplitude (or peak) of the first frequency FREQ1 having the smallest time constant may be the largest, and the amplitude (or peak) of the sixth frequency FREQ6 having the largest time constant may be the smallest. As the frequency increases in the six second touch electrodes Rx1 to Rx6 (that is, from the sixth frequency FREQ6 to the first frequency FREQ1), the amplitude may sequentially increase.

Referring to FIG. 19A, as the frequency increases in each of the six second touch electrodes Rx1 to Rx6, the amplitude may sequentially increase. In addition, amplitudes between the six second touch electrodes Rx1 to Rx6 have no significant difference and are uniform. Therefore, the table shown in FIG. 19A is for the first case, and it can be understood that the second electrode (or cathode electrode) is formed well (for example, uniformly).

FIG. 19B is a table illustrating an example of an amplitude of the touch sensing signal in the third case. Values shown in the table of FIG. 19B represent relative amplitudes (or peaks) of waveforms obtained by converting the touch sensing signal TSS of the third case (Case 3) described with reference to FIG. 18 into the frequency domain.

Six first touch electrodes Tx1 to Tx6 are shown as an example, and frequencies of the touch driving signals input to the first touch electrodes Tx1 to Tx6 may correspond to the first to sixth frequencies FREQ1 to FREQ6, respectively. Six second touch electrodes Rx1 to Rx6 are shown as an example, and the touch sensing signals output from the second touch electrodes Rx1 to Rx6 may include signals of the first to sixth frequencies FREQ1 to FREQ6.

In the third case, a high peak value (for example, abnormally high peak value or one above a predetermined level) may be detected in at least one of the six second touch electrodes Rx1 to Rx6, unlike the others.

Referring to FIG. 19B, a signal detected from the sixth second touch electrode Rx6 may have a higher peak value than at least one of the other five touch electrodes (for example, Rx1 to Rx5). In particular, for the signal of the first frequency FREQ1, first to fourth second touch electrodes Rx1 to Rx4 may have a value of about 0.33 to 0.36, while the sixth second touch electrode Rx6 may have a very high value of 0.64.

Therefore, the table shown in FIG. 19B is for the third case, and it can be understood that the second electrode (or cathode electrode) is formed poorly (for example, non-uniformly). Thus, this may imply that the second electrode (or cathode electrode) is not formed to a sufficient thickness in an area overlapping the sixth second touch electrode Rx6.

In accordance with one or more of the aforementioned embodiments, by applying touch driving signals TDS having different frequencies to the plurality of first touch electrodes Tx and comparing the touch sensing signals TSS detected from the plurality of second touch electrodes Rx, the location of an area where the common electrode (for example, the cathode electrode) is formed poorly can be detected. Through this, it is possible to inspect whether the common electrode (for example, the cathode electrode) is formed well without destroying the display device 100.

According to the display device and inspection method thereof according to the present disclosure, it is possible to inspect whether the common electrode is formed with a uniform thickness without destroying the display device. When used herein, the terms "high", "low", and "thin" when referring to a thickness of common electrode CE may be determined relative to one or more predetermined levels, either taken directly or based on a relative comparison.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, modules, units, multiplexers, generators, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, devices, modules, units, multiplexers, generators, logic, interfaces, decoders, drivers, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The drawings referred to heretofore and the detailed description of the invention described above are merely illustrative of the invention. It is to be understood that the invention has been disclosed for illustrative purposes only and is not intended to limit the meaning or scope of the invention as set forth in the claims. Therefore, those skilled in the art will appreciate that various modifications and equivalent embodiments are possible without departing from the scope of the invention. Accordingly, the true technical protection scope of the invention should be determined by the technical idea of the appended claims. The embodiments may be combined to form additional embodiments.

What is claimed is:

1. A method for inspecting a display device comprising:
   inputting a touch driving signal to a first touch electrode of a touch panel adjacent to a display panel;
   receiving a touch sensing signal from a second touch electrode of the touch panel;
   converting the touch sensing signal from a time domain to a frequency domain;
   detecting at least one peak in a converted touch sensing signal; and
   determining a defect in the display panel based on the at least one peak.

2. The method of claim 1, wherein the defect is indicative of a thickness of a common electrode of a corresponding light-emitting element in the display panel.

3. The method of claim 2, wherein determining the defect includes:
   determining whether the at least one peak is above a predetermined level, and
   detecting the defect when the at least one peak is above the predetermined level.

4. The method of claim 2, wherein:
   the touch sensing signal includes a plurality of peaks, and
   determining the defect includes detecting that the plurality of peaks increase non-sequentially.

5. The method of claim 2, wherein the at least one peak is indicative of a resistance of the common electrode above a predetermined level at a location overlapping the first touch electrode.

* * * * *